US010970582B2

(12) United States Patent
Alletto et al.

(10) Patent No.: US 10,970,582 B2
(45) Date of Patent: Apr. 6, 2021

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventors: Stefano Alletto, Sunnyvale, CA (US); Sotaro Tsukizawa, Osaka (JP); Yasunori Ishii, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 72 days.

(21) Appl. No.: 16/558,960

(22) Filed: Sep. 3, 2019

(65) Prior Publication Data
US 2020/0082197 A1 Mar. 12, 2020

Related U.S. Application Data

(60) Provisional application No. 62/767,223, filed on Nov. 14, 2018, provisional application No. 62/747,883, (Continued)

(30) Foreign Application Priority Data

Feb. 21, 2019 (JP) .............................. JP2019-029409
Mar. 29, 2019 (JP) .............................. JP2019-065416

(51) Int. Cl.
*G06K 9/40* (2006.01)
*G06K 9/62* (2006.01)
*G06K 9/68* (2006.01)

(52) U.S. Cl.
CPC ............. *G06K 9/40* (2013.01); *G06K 9/6256* (2013.01); *G06K 9/6263* (2013.01); *G06K 9/68* (2013.01)

(58) Field of Classification Search
CPC ...... G06K 9/40; G06K 9/6255; G06K 9/6256; G06K 9/6263; G06K 9/68; G06K 9/0051;
(Continued)

(56) References Cited

U.S. PATENT DOCUMENTS 7,450,779 B2 * 11/2008 Ferrari ..................... G06K 9/40
382/128
7,576,777 B2 * 8/2009 Kondo ................. G06K 9/4609
348/208.4
(Continued)

OTHER PUBLICATIONS

Partial European Search Report dated Feb. 6, 2020 in corresponding European Patent Application No. 19194089.9.
(Continued)

*Primary Examiner* — Manav Seth
(74) *Attorney, Agent, or Firm* — Wenderoth, Lind & Ponack, L.L.P.

(57) ABSTRACT

An information processing method includes: obtaining noise region estimation information output from a first converter by a first image including a noise region being input to the first converter; obtaining a second image, on which noise region removal processing has been performed, output from a second converter by the noise region estimation information and the first image being input to the second converter; generating a fourth image including the estimated noise region by using the noise region estimation information and a third image including no noise region and a scene corresponding to the first image; training the first converter by using machine learning in which the first image is reference data and the fourth image is conversion data; and training the second converter by using machine learning in which the third image is reference data and the second image is conversion data.

10 Claims, 16 Drawing Sheets

Related U.S. Application Data filed on Oct. 19, 2018, provisional application No. 62/728,431, filed on Sep. 7, 2018.

(58) Field of Classification Search
CPC . G06K 9/03; G06K 9/42; G06T 5/002; G06T 2207/20081; G06T 2207/20084; G06T 5/003; G06T 2207/20182; G06T 2207/20192; G06T 2207/20201; G06T 5/006; G06T 5/008; G06T 5/10; G06T 2207/20012; G06T 2207/20032; G06N 20/00; G06N 3/084; G06N 3/0445; H04N 5/3651; H04N 19/86; H04N 5/347; H04N 19/117; A61B 8/5269; A61B 6/5258; A61B 5/7203

See application file for complete search history.

(56) References Cited

U.S. PATENT DOCUMENTS

| | | | | |
|---|---|---|---|---|
| 7,646,889 | B2* | 1/2010 | Tsukamoto | G06K 9/00791 382/104 |
| 7,657,113 | B2* | 2/2010 | Wong | G06K 9/40 382/260 |
| 7,860,167 | B2* | 12/2010 | Le Dinh | H04N 5/21 375/240.2 |
| 7,949,522 | B2* | 5/2011 | Hetherington | G10L 21/0208 704/226 |
| 7,986,854 | B2* | 7/2011 | Kim | H04N 19/80 382/275 |
| 8,204,128 | B2* | 6/2012 | Huchet | H04N 19/61 375/240.18 |
| 8,363,970 | B2* | 1/2013 | Suto | G06T 5/002 382/254 |
| 8,503,530 | B2* | 8/2013 | Miao | H04N 19/573 375/240.16 |
| 8,797,417 | B2* | 8/2014 | Gayko | G06T 5/50 348/222.1 |
| 8,861,881 | B2* | 10/2014 | Tate | G06T 5/005 382/254 |
| 9,045,112 | B2* | 6/2015 | Kracker | G06K 9/00791 |
| 9,077,869 | B2* | 7/2015 | Tripathi | G06T 5/005 |
| 9,189,834 | B2* | 11/2015 | Lin | G06K 9/4609 |
| 9,262,810 | B1* | 2/2016 | Tuzel | G06T 5/002 |
| 9,286,505 | B2* | 3/2016 | Ajemba | G06T 7/155 |
| 9,332,953 | B2* | 5/2016 | Suzuki | G06T 3/4046 |
| 9,591,240 | B1* | 3/2017 | Barbu | G06T 5/003 |
| 9,773,182 | B1* | 9/2017 | Wolkerstorfer | G06K 9/3208 |
| 10,049,284 | B2* | 8/2018 | Jain | G06K 9/66 |
| 10,282,827 | B2* | 5/2019 | Ulaganathan | G06T 7/001 |
| 10,643,320 | B2* | 5/2020 | Lee | G06T 5/005 |
| 2011/0137837 | A1* | 6/2011 | Kobayashi | G06T 5/002 706/13 |
| 2013/0275007 | A1* | 10/2013 | Chen | G06K 9/00791 701/49 |
| 2014/0347487 | A1* | 11/2014 | Ahiad | G06T 7/11 348/148 |
| 2015/0015711 | A1* | 1/2015 | Ahiad | G06K 9/00791 348/148 |
| 2015/0178591 | A1* | 6/2015 | Fergus | G06K 9/4604 382/157 |
| 2016/0063685 | A1* | 3/2016 | Tuzel | G06K 9/4642 382/159 |
| 2016/0300333 | A1* | 10/2016 | Fergus | G06T 5/005 |
| 2017/0293808 | A1 | 10/2017 | Jain et al. | |
| 2018/0254064 | A1* | 9/2018 | Gonzalez-Banos | G06F 16/7867 |
| 2018/0349759 | A1* | 12/2018 | Isogawa | G06N 3/0454 |
| 2019/0098034 | A1* | 3/2019 | Wakasugi | G06T 7/136 |
| 2019/0156524 | A1* | 5/2019 | Park | G06T 7/0012 |
| 2020/0074234 | A1* | 3/2020 | Tong | G06T 5/002 |
| 2020/0104711 | A1* | 4/2020 | Aytekin | G06N 3/088 |
| 2020/0118249 | A1* | 4/2020 | Kim | G06N 3/04 |
| 2020/0175368 | A1* | 6/2020 | Hu | G06N 3/08 |

OTHER PUBLICATIONS

Rui Qian et al., "Attentive Generative Adversarial Network for Raindrop Removal from a Single Image", IEEE/CVF Conference on Computer Vision and Pattern Recognition, Jun. 2018, pp. 2482-2491.

Xin Jin et al., "Unsupervised Single Image Deraining with Self-supervised Constraints", Arxiv.org, Cornell University Library, Nov. 2018, pp. 1-10.

Shaodi You et al., "Adherent Raindrop Modeling, Detection and Removal in Video", IEEE Transactions on Pattern Analysis and Machine Intelligence, Sep. 2016, vol. 38, No. 9, pp. 1721-1733.

Ian J. Goodfellow, et al., "Generative Adversarial Nets", Proceedings of Neural Information Processing Systems, Dec. 2014.

Phillip Isola, et al., "Image-to-Image Translation with Conditional Adversarial Networks", Proceedings of the IEEE Conference on Computer Vision and Pattern Recognition (CVPR), Jul. 2017, pp. 1125-1134.

Justin Johnson, et al., "Perceptual Losses for Real-Time Style Transfer and Super-Resolution", Proceedings of European Conference on Computer Vision, Mar. 2016.

Kaiming He, et al., "Deep Residual Learning for Image Recognition", Proceedings of the IEEE Conference on Computer Vision and Pattern Recognition (CVPR), Jun. 2016, pp. 770-778.

Rui Qian, et al., "Attentive Generative Adversarial Network for Raindrop Removal from a Single Image", Proceedings of the IEEE Conference on Computer Vision and Pattern Recognition (CVPR), May 2018.

Jun-Yan Zhu, et al., "Unpaired Image-to-Image Translation using Cycle-Consistent Adversarial Networks", Proceedings of the IEEE International Conference on Computer Vision (ICCV), Mar. 2017, pp. 2223-2232.

Yaoru Sun, et al., "Object-based Visual Attention for Computer Vision", Artificial Intelligence, vol. 146, No. 1, May 2003, pp. 77-123.

* cited by examiner

INFORMATION PROCESSING METHOD, INFORMATION PROCESSING DEVICE, AND RECORDING MEDIUM

CROSS REFERENCE TO RELATED APPLICATION

This application claims the benefit of priority of Japanese Patent Application Number 2019-029409 filed on Feb. 21, 2019, Japanese Patent Application Number 2019-065416 filed on Mar. 29, 2019, U.S. Provisional Patent Application No. 62/728,431 filed on Sep. 7, 2018, U.S. Provisional Patent Application No. 62/747,883 filed on Oct. 19, 2018, and U.S. Provisional Patent Application No. 62/767,223 filed on Nov. 14, 2018, the entire contents of which are hereby incorporated by reference.

BACKGROUND

1. Technical Field

The present disclosure relates to an information processing method, an information processing device, and an information processing recording medium.

2. Description of the Related Art

Conventionally, a technique is known which classifies an image as an image of a rainy condition or not by using deep learning (see, for example, US Patent Application Publication No. 2017/0293808).

SUMMARY

In the conventional technique, it is difficult to effectively remove local noise from an image.

In view of the above, an object of the present disclosure is to provide an information processing method, an information processing device, and an information processing recording medium which are capable of effectively removing local noise from an image.

An information processing method according to one aspect of the present disclosure, performed by a computer, includes: obtaining a first image including a noise region; obtaining noise region estimation information indicating the noise region which is estimated, the noise region estimation information being output from a first converter as a result of the first image being input to the first converter; obtaining a second image on which noise region removal processing has been performed, the second image being output from a second converter as a result of the noise region estimation information and the first image being input to the second converter; obtaining a third image which does not include the noise region, the third image including a scene identical to or corresponding to a scene included in the first image; generating a fourth image by using the noise region estimation information and the third image, the fourth image including the noise region which is estimated; training the first converter by using machine learning in which the first image is reference data and the fourth image is conversion data; and training the second converter by using machine learning in which the third image is reference data and the second image is conversion data.

An information processing method according to one aspect of the present disclosure, performed by a computer, includes: obtaining a first image including a noise region and a preceding second image, the preceding second image being obtained by processing performed on a preceding first image preceding the first image by a predetermined number of frames, the preceding second image preceding a second image by the predetermined number of frame, the second image being an image on which noise removal processing has been performed; obtaining the second image and first motion information which are output from a first converter as a result of the first image and the preceding second image being input to the first converter; obtaining a third image by using the first motion information and the preceding second image; and training the first converter by using machine learning in which the third image is reference data and the second image is conversion data.

An information processing device according to one aspect of the present disclosure includes: a processor; and a memory. The memory stores a first converter and a second converter, and the processor: obtains a first image including a noise region from an image capturing device; obtains noise region estimation information indicating the noise region which is estimated, the noise region estimation information being output from the first converter as a result of the first image being input to the first converter; obtains a second image on which noise region removal processing has been performed, the second image being output from the second converter as a result of the noise region estimation information and the first image being input to the second converter; and outputs the second image obtained, the first converter is trained by using machine learning in which a fourth image is conversion data and the first image is reference data, the fourth image including the noise region which is estimated, the fourth image being generated by using the noise region estimation information and a third image which does not include the noise region and includes a scene identical to or corresponding to a scene included in the first image, and the second converter is trained by using machine learning in which the second image is conversion data and the third image is reference data.

An information processing recording medium according to one aspect of the present disclosure is a non-transitory computer-readable recording medium which stores an information processing program for causing a computer to perform information processing. The computer includes a processor and a memory which stores a first converter and a second converter. The information processing includes the following performed by the computer: obtaining a first image including a noise region; obtaining noise region estimation information indicating the noise region which is estimated, the noise region estimation information being output from the first converter as a result of the first image being input to the first converter; obtaining a second image on which noise region removal processing has been performed, the second image being output from the second converter as a result of the noise region estimation information and the first image being input to the second converter; obtaining a third image which does not include the noise region and includes a scene identical to or corresponding to a scene included in the first image; and generating a fourth image by using the noise region estimation information and the third image, the fourth image including the noise region which is estimated. The first converter is trained by using machine learning in which the first image is reference data and the fourth image is conversion data, and the second converter is trained by using machine learning in which the third image is reference data and the second image is conversion data.

An information processing method, an information processing device, and an information processing recording medium according to one aspect of the present disclosure are capable of effectively removing local noise from an image.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
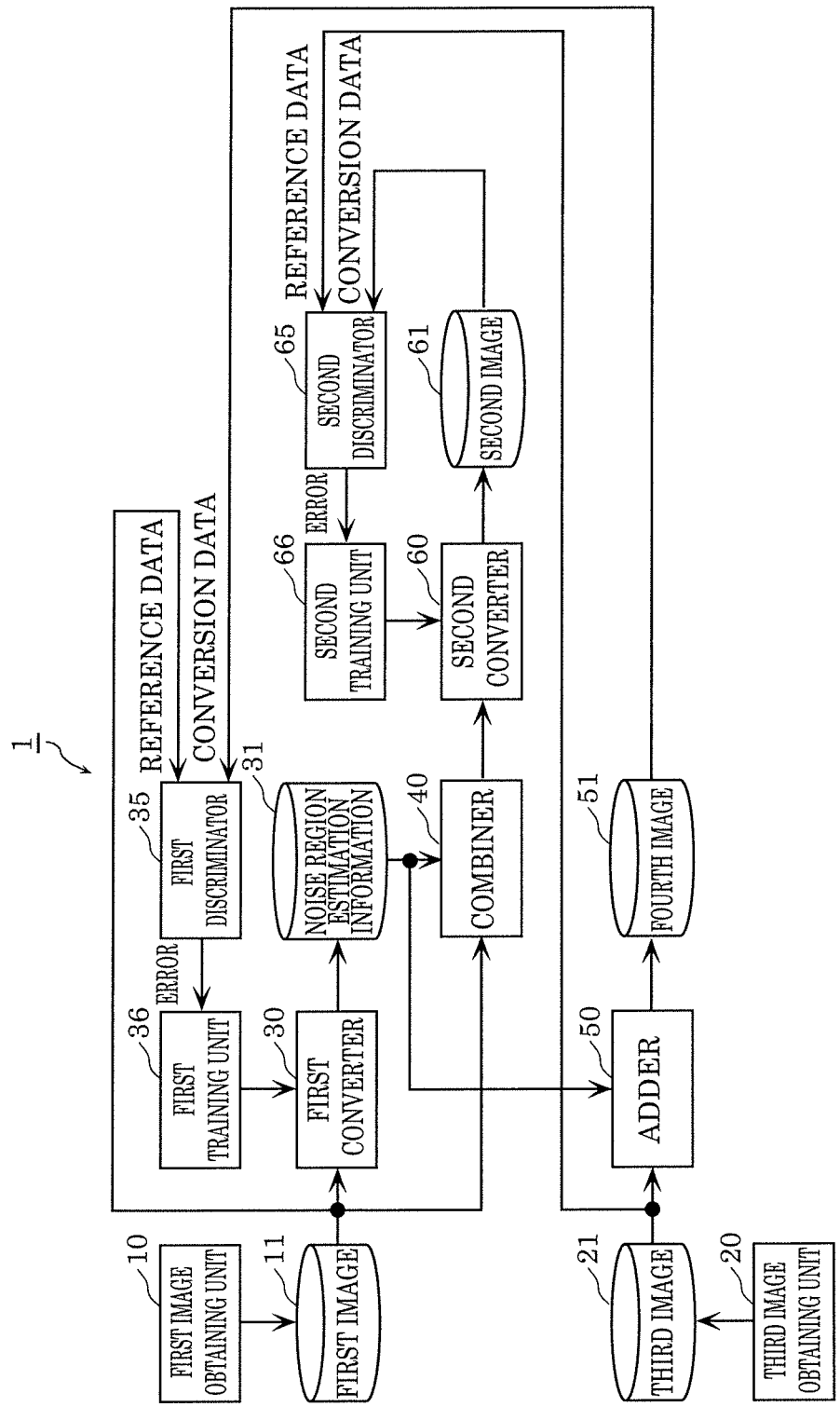
FIG. 1 is a block diagram illustrating a configuration of a first training device according to Embodiment 1.

DETAILED DESCRIPTION OF THE EMBODIMENTS (Underlying Knowledge Leading to an Aspect of the Present Disclosure)

In general, when a machine learning model is to be trained so as to remove noise from an image, the machine learning model is trained so that an error in an image in its entirety is minimized while an image with no noise is used as reference data (also referred to as correct data or label data) and an image with noise is used as conversion data (also referred to as training data).

In contrast, for example, an image captured by a camera having a lens with raindrops on includes local noise due to the raindrops in the regions with the raindrops, but includes no noise due to the raindrops in most of the regions with no raindrops. When a machine learning model is to be trained relative to an image including local noise by the above method, the errors in most of the regions are reduced. This results in the training of the machine learning model possibly not progressing.

The inventors repeatedly made diligent examination in order to solve the above problem. The inventors have found that a machine learning model can be trained effectively relative to an image including local noise by estimating the regions of the local noise in the image, and weighting the estimated regions in the image. As a result, the inventors have arrived at the information processing method, the information processing device, and the information processing recording medium described below.

An information processing method according to one aspect of the present disclosure, performed by a computer, includes: obtaining a first image including a noise region; obtaining noise region estimation information indicating the noise region which is estimated, the noise region estimation information being output from a first converter as a result of the first image being input to the first converter; obtaining a second image on which noise region removal processing has been performed, the second image being output from a second converter as a result of the noise region estimation information and the first image being input to the second converter; obtaining a third image which does not include the noise region, the third image including a scene identical to or corresponding to a scene included in the first image; generating a fourth image by using the noise region estimation information and the third image, the fourth image including the noise region which is estimated; training the first converter by using machine learning in which the first image is reference data and the fourth image is conversion data; and training the second converter by using machine learning in which the third image is reference data and the second image is conversion data.

According to the above information processing method, the first converter can be trained so as to estimate one or more noise regions in the first image, and the second converter can be trained so as to weight the noise regions in the first image estimated by the first converter and output the second image. Accordingly, the first converter and the second converter can be effectively trained so as to remove local noise from an image. Hence, use of the first converter and the second converter trained by the information processing method above allows local noise to be effectively removed from an image.

Moreover, it may be that the information processing method further includes: obtaining a preceding second image obtained by processing performed on a preceding first image which precedes the first image by a predetermined number of frames, the preceding second image preceding the second image by the predetermined number of frames; obtaining first motion information, the first motion information being output from the first converter as a result of the first image and the preceding second image being input to the first converter; obtaining the third image by using the first motion information and the preceding second image; obtaining second motion information by comparing the first image with the preceding first image; and training the first converter by using machine learning in which the second motion information is reference data and the first motion information is conversion data.

Moreover, it may be that the information processing method further includes obtaining the noise region estimation information, the noise region estimation information being output from the first converter as a result of the first image and the preceding second image being input to the first converter.

Moreover, it may be that feedback data used for training the first converter is output from a first discriminator as a result of the first image and the fourth image being input to the first discriminator, the first discriminator being trained by using machine learning so as to discriminate an input image as conversion data of the first converter or not, or discriminate the input image as reference data or not, and feedback data used for training the second converter is output from a second discriminator as a result of the second image and the third image being input to the second discriminator, the second discriminator being trained by using machine learning so as to discriminate an input image as conversion data of the second converter or not, or discriminate the input image as reference data or not.

Moreover, it may be that each of the first converter and the second converter is a neural network model.

An information processing method according to one aspect of the present disclosure, performed by a computer, includes: obtaining a first image including a noise region and a preceding second image, the preceding second image being obtained by processing performed on a preceding first image preceding the first image by a predetermined number of frames, the preceding second image preceding a second image by the predetermined number of frame, the second image being an image on which noise removal processing has been performed; obtaining the second image and first motion information which are output from a first converter as a result of the first image and the preceding second image being input to the first converter; obtaining a third image by using the first motion information and the preceding second image; and training the first converter by using machine learning in which the third image is reference data and the second image is conversion data.

According to the above information processing method, the first converter can be trained so as to estimate one or more noise regions in the first image, and the first converter can be trained so as to output a second image in which the noise regions in the first image estimated by the first converter are weighted. Accordingly, the first converter can be effectively trained so as to remove local noise from an image. Hence, use of the first converter trained by the information processing method above allows local noise to be effectively removed from an image.

Moreover, it may be that the first image is an image captured by a camera, and the noise region is a region including noise caused by a substance adhered on one of a lens and a lens cover of the camera.

An information processing device, according to one aspect of the present disclosure, includes: a processor; and a memory. The memory stores a first converter and a second converter, and the processor: obtains a first image including a noise region from an image capturing device; obtains noise region estimation information indicating the noise region which is estimated, the noise region estimation information being output from the first converter as a result of the first image being input to the first converter; obtains a second image on which noise region removal processing has been performed, the second image being output from the second converter as a result of the noise region estimation information and the first image being input to the second converter; and outputs the second image obtained. The first converter is trained by using machine learning in which a fourth image is conversion data and the first image is reference data, the fourth image including the noise region which is estimated, the fourth image being generated by using the noise region estimation information and a third image which does not include the noise region and includes a scene identical to or corresponding to a scene included in the first image, and the second converter is trained by using machine learning in which the second image is conversion data and the third image is reference data.

According to the above information processing device, the first converter can be trained so as to estimate one or more noise regions in the first image, and the second converter can be trained so as to output a second image in which the noise regions in the first image estimated by the first converter are weighted. Accordingly, the first converter and the second converter can be effectively trained so as to remove local noise from an image. Hence, according to the information processing device, local noise can be effectively removed from an image.

An information processing recording medium according to one aspect of the present disclosure is a non-transitory computer-readable recording medium which stores an information processing program for causing a computer to perform information processing. The computer includes a processor and a memory which stores a first converter and a second converter. The information processing includes the following performed by the computer: obtaining a first image including a noise region; obtaining noise region estimation information indicating the noise region which is estimated, the noise region estimation information being output from the first converter as a result of the first image being input to the first converter; obtaining a second image on which noise region removal processing has been performed, the second image being output from the second converter as a result of the noise region estimation information and the first image being input to the second converter; obtaining a third image which does not include the noise region and includes a scene identical to or corresponding to a scene included in the first image; and generating a fourth image by using the noise region estimation information and the third image, the fourth image including the noise region which is estimated. The first converter is trained by using machine learning in which the first image is reference data and the fourth image is conversion data, and the second converter is trained by using machine learning in which the third image is reference data and the second image is conversion data.

According to the above information processing program, the first converter can be trained so as to estimate one or more noise regions in the first image, and the second converter can be trained so as to output a second image in which the noise regions in the first image estimated by the first converter are weighted. Accordingly, the first converter and the second converter can be effectively trained so as to remove local noise from an image. Hence, according to the information processing program, local noise can be effectively removed from an image.

Hereinafter, specific examples of the information processing method, the information processing device, and the information processing system according to one aspect of the present disclosure will be described with reference to the drawings. Note that the embodiments described below each show a specific example of the present disclosure. Accordingly, the numerical values, shapes, structural components, the arrangement and connection of the structural components, steps (processes), the order of the steps, and the like indicated in the following embodiments are mere examples, and therefore do not intend to limit the present disclosure. Among the structural components in the following embodiments, those not recited in any of the independent claims are described as optional structural components. Note that the drawings are represented schematically and are not necessarily precise illustrations.

General and specific aspects in the present disclosure may be implemented using a system, a method, an integrated circuit, a computer program, or a computer-readable recording medium such as a CD-ROM, or any combination of systems, methods, integrated circuits, computer programs, or computer-readable recording media.

Embodiment 1

[1-1. First Training Device]

Hereinafter, a first training device according to Embodiment 1 will be described. The first training device includes a first converter (a first generator or a first denoiser) and a second converter (a second generator or a second denoiser) made of machine learning models. The first training device trains the first converter so as to estimate one or more noise regions in a first image including one or more noise regions. The first training device trains the second converter so as to output a second image. The second image is an image obtained by performing noise region removal processing on the first image by weighting the noise regions estimated by the first converter.

[1-1-1. Configuration of First Training Device]

FIG. 1 is a block diagram illustrating a configuration of first training device 1 according to Embodiment 1.

As illustrated in FIG. 1, first training device 1 includes: first image obtaining unit 10, first image storage 11, third image obtaining unit 20, third image storage 21, first converter 30, noise region estimation information storage 31, first discriminator 35, first training unit 36, combiner 40, adder 50, fourth image storage 51, second converter 60, second image storage 61, second discriminator 65, and second training unit 66.

First training device 1 may be realized by, for example, a computer including a processor and a memory. In this case, each structural component of first training device 1 may be realized by, for example, the processor executing one or more programs stored in the memory. Moreover, first training device 1 may be realized by, for example, a plurality of computers, each of which includes a processor and a memory and which can communicate each other, operating in cooperation. In this case, each structural component of first training device 1 may be realized by, for example, any one of the one or more processors executing one or more programs stored in one or more memories. In the description below, first training device 1 is realized by, for example, a computer including a processor and a memory.

First image obtaining unit 10 obtains a first image including one or more noise regions. The first image may be, for example, an image captured by a camera. Moreover, the noise regions may be regions including noise caused by substances adhered on the camera lens or lens cover (for example, raindrops). First image obtaining unit 10 may obtain, for example, the first image from an image capturing device or a recording medium communicatively connected in a wired or wireless manner.

Third image obtaining unit 20 obtains one or more third images including no noise region. The third images each include a scene identical to or corresponding to the scene included in the first image. Third image obtaining unit 20 may obtain, for example, the third images from an image capturing device or a recording medium communicatively connected in a wired or wireless manner.

First image obtaining unit 10 and third image obtaining unit 20 may respectively obtain a plurality of first images and a plurality of third images. In this case, the plurality of first images and the plurality of third images are associated in a one-to-one correspondence relationship. In this case, for example, each of the first images may be an image obtained by performing computer graphics (CG) processing on the corresponding third image to additionally include noise regions. For example, it may also be that each of the first images is an image captured at the approximately same time and having substantially the same angle of view as the corresponding third image.

Figure 2A:
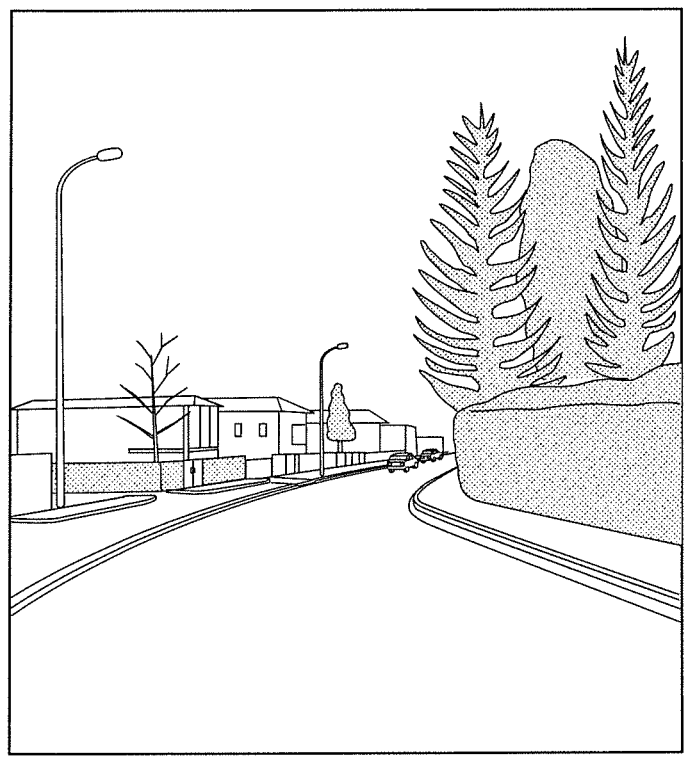
FIG. 2A schematically illustrates an example of a third image.
Figure 2B:
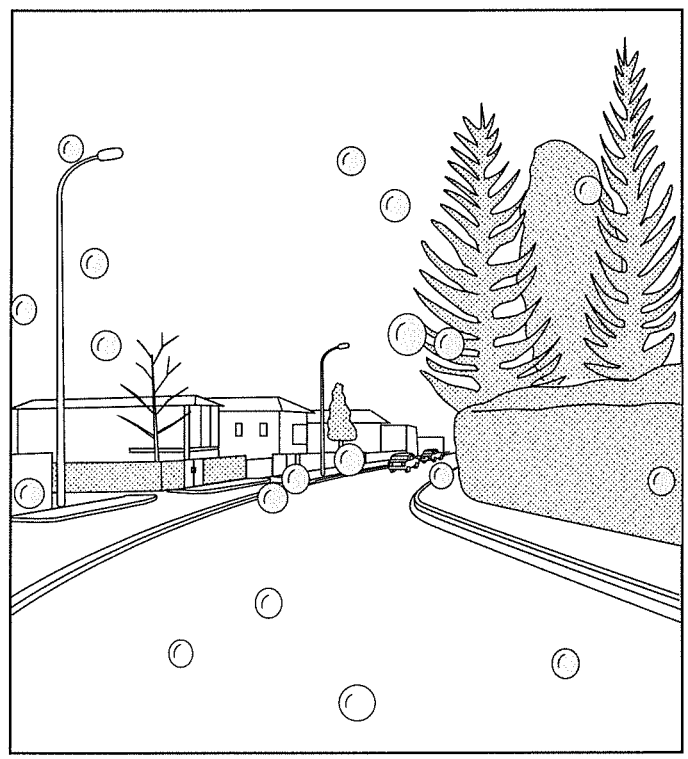
FIG. 2B schematically illustrates an example of a first image.

FIG. 2A schematically illustrates an example of a third image. The third image illustrated in FIG. 2A as an example is an image of the forward region of a vehicle captured by an in-vehicle camera. FIG. 2B schematically illustrates an example of a first image. The first image illustrated in FIG. 2B as an example is an image obtained by performing CG processing on a corresponding third image.

Referring back to FIG. 1, description of first training device 1 is continued.

First image storage 11 stores the first image obtained by first image obtaining unit 10.

Third image storage 21 stores the third image obtained by third image obtaining unit 20.

First converter 30 is a machine learning model trained by using machine learning so as to output noise region estimation information indicating one or more estimated noise regions, when the first image is input to first converter 30. Here, the noise region estimation information is an image with pixel values of noise components among pixel values of pixels included in the estimated noise regions. First converter 30 may be any machine learning model as long as it can be trained so as to output noise region estimation information when the first image is input to first converter 30. Here, first converter 30 is a convolutional neural network model.

Noise region estimation information storage 31 stores the noise region estimation information output from first converter 30.

Combiner 40 combines the noise region estimation information stored in noise region estimation information storage 31 and the first image stored in first image storage 11 and corresponding to the noise region estimation information in the channel direction, and inputs the combined result to second converter 60.

Second converter 60 is a machine learning model trained by using machine learning so as to output a second image when the noise region estimation information and the first image combined in the channel direction is input to second converter 60. The second image is an image obtained by performing noise region removal processing on the first image. Second converter 60 may be any machine learning model as long as it can be trained so as to output the second image when the noise region estimation information and the first image combined in the channel direction are input to second converter 60. Here, second converter 60 is a convolutional neural network model.

Second image storage 61 stores the second image output from second converter 60.

Adder 50 generates a fourth image including the estimated noise regions, by using the noise region estimation information stored in noise region estimation information storage 31 and the third image stored in third image storage 21 and corresponding to the noise region estimation information. More specifically, adder 50 generates a fourth image by adding pixel values of the pixels in the corresponding positions in the first image and the third image.

Fourth image storage 51 stores the fourth image generated by adder 50.

First discriminator 35 is a machine learning model which forms a generative adversarial network (GAN) in which first converter 30 is a generator and first discriminator 35 is a discriminator. When the first image is input to first discriminator 35 as reference data and the fourth image is input to first discriminator 35 as conversion data, first discriminator 35 discriminates each of the first image and the fourth image as true or false as reference data. In other words, the sameness between the first images and the sameness between the fourth image and the first image are classified. It may be that true or false as conversion data is classified instead of as reference data. First discriminator 35 then outputs an error based on the classification result. Moreover, first discriminator 35 is trained by using machine learning based on the classification result. Specifically, when the first image stored in first image storage 11 is input to first discriminator 35 as reference data, first discriminator 35 discriminates the first image as reference data or not. Moreover, when the fourth image stored in fourth image storage 51 and corresponding to the first image is input to first discriminator 35 as conversion data, first discriminator 35 discriminates the fourth image as reference data or not. For example, each classification result is represented by a probability value. First discriminator 35 then outputs an error based on the classification result of the fourth image. First discriminator 35 is trained based on the classification results of the first image and the fourth image. For example, first discriminator 35 outputs, as an error, a value (hereinafter, also referred to as first feedback data) calculated based on the probability that the fourth image is reference data. Moreover, first discriminator 35 outputs a value (hereinafter, also referred to as second feedback data) calculated based on the probability that the first image is reference data and the probability that the fourth image is reference data. First discriminator 35 may be any machine learning model as long as, when the first image and the fourth image are input to first discriminator 35, first discriminator 35 discriminates the sameness between the first image and the fourth image, outputs an error based on the classification result, and is trained based on the classification result. Here, first discriminator 35 is a convolutional neural network model.

First training unit 36 trains first converter 30 by using the first feedback data output from first discriminator 35. Specifically, first training unit 36 provides, to first converter 30, feedback of the first feedback data output from first discriminator 35. By doing so, first training unit 36 trains first converter 30 so as to output noise region estimation information which indicates one or more estimated noise regions when the first image is input to first converter 30. First training unit 36 also trains first discriminator 35 by using the second feedback data output from first discriminator 35. Specifically, first training unit 36 provides, to first discriminator 35, feedback of the second feedback data output from first discriminator 35. By doing so, first training unit 36 trains first discriminator 35 so as to discriminate the first image as reference data and the fourth data as conversion data when the first image and the fourth image are input to first discriminator 35.

Second discriminator 65 is a machine learning model which forms a GAN in which second converter 60 is a generator and second discriminator 65 is a discriminator. When the third image is input to second discriminator 65 as reference data and the second image is input to second discriminator 65 as conversion data, second discriminator 65 discriminates each of the third image and the second image as true or false as reference data. In other words, the sameness between the third images and the sameness between the second image and the third image are classified. It may be that true or false as conversion data is classified instead of as reference data. Second discriminator 65 then outputs an error based on the classification result. Moreover, second discriminator 65 is trained based on the classification result by using machine learning. Specifically, when the third image stored in third image storage 21 is input to second discriminator 65 as reference data, second discriminator 65 discriminates the third image as reference data or not. Moreover, when the second image stored in second image storage 61 and corresponding to the third image is input to second discriminator 65 as conversion data, second discriminator 65 discriminates the second image as reference data or not. For example, each classification result is represented by a probability value. Second discriminator 65 then outputs an error based on the classification result of the second image. Second discriminator 65 is trained based on the classification results of the third image and the second image. For example, second discriminator 65 outputs, as an error, a value (hereinafter, also referred to as third feedback data) calculated based on the probability that the second image is reference data. Moreover, second discriminator 65 outputs a value (hereinafter, also referred to as fourth feedback data) calculated based on the probability that the third image is reference data and the probability that the second image is reference data. Second discriminator 65 may be any machine learning model as long as, when the third image and the second image are input to second discriminator 65, second discriminator 65 discriminates the sameness between the third image and the second image, outputs an error based on the classification result, and is trained based on the classification result. Here, second discriminator 65 is a convolutional neural network model.

Second training unit 66 trains second converter 60 by using the third feedback data output from second discriminator 65. Specifically, second training unit 66 provides, to second converter 60, feedback of the third feedback data output from second discriminator 65. By doing so, second training unit 66 trains second converter 60 so as to output the second image when the noise region estimation information and the first image combined in the channel direction are input to second converter 60. Second training unit 66 trains second discriminator 65 by using the fourth feedback data output from second discriminator 65. Specifically, second training unit 66 provides, to second discriminator 65, feedback of the fourth feedback data output from second discriminator 65. By doing so, second training unit 66 trains second discriminator 65 so as to discriminate the third image as reference data and the second data as conversion data when the third image and the second image are input to second discriminator 65.

[1-1-2. Operation of First Training Device]

First training device 1 configured as above performs first training processing. In the first training processing, first training device 1 trains first converter 30 by using machine learning in which the first image is reference data and the fourth image is conversion data, and trains second converter 60 by using machine learning in which the third image is reference data and the second image is conversion data.

Figure 3:
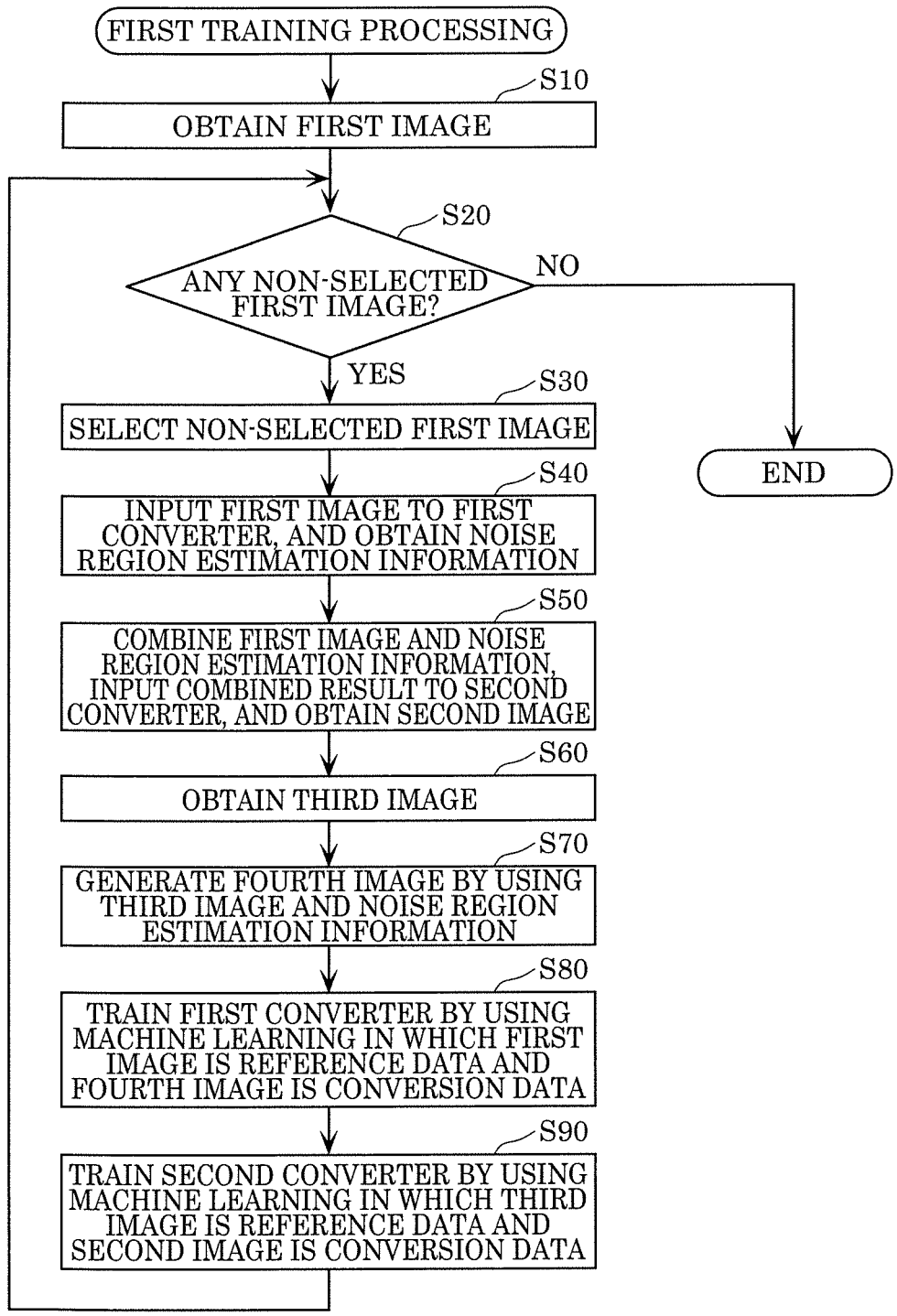
FIG. 3 is a flowchart of first training processing according to Embodiment 1.

FIG. 3 is a flowchart of the first training processing.

The first training processing starts, for example, when an operation for starting the first training processing is performed on first training device 1.

When the first training processing starts, first image obtaining unit 10 obtains one or more first images (step S10). When the first images are obtained, first image storage 11 stores the obtained first images.

When the first images are stored in first image storage 11, first converter 30 checks whether or not non-selected first images exist in the first images stored in first image storage 11 (step S20). Here, the non-selected first images refer to first images which have not yet been selected in the loop processing from step S20 to step S90 to be described later.

In step S20, when non-selected first images exist (Yes in step S20), first converter 30 selects one of the non-selected first images (step S30).

When first converter 30 selects one of the non-selected first images, first converter 30 inputs the selected first image to first converter 30, and outputs noise region estimation information (step S40). When the noise region estimation information is output, noise region estimation information storage 31 stores the output noise region estimation information.

When the noise region estimation information is stored, combiner 40 combines the noise region estimation information and the selected first image in the channel direction, and inputs the combined result to second converter 60. Second converter 60 then outputs a second image (step S50). When the second image is output, second image storage 61 stores the output second image.

When the second image is stored, third image obtaining unit 20 obtains a third image corresponding to the selected first image (step S60). When the third image is obtained, third image storage 21 stores the obtained third image.

When the third image is stored, adder 50 generates a fourth image by using the third image, and the noise region estimation information stored in noise region estimation information storage 31 and corresponding to the selected first image (step S70). When the fourth image is output, fourth image storage 51 stores the generated fourth image.

When the fourth image is stored, first discriminator 35 and first training unit 36 train first converter 30 by using machine learning in which the selected first image is reference data and the forth image is conversion data (step S80). More specifically, first discriminator 35 outputs an error between the first image and the fourth image, and first training unit 36 trains first converter 30 by providing feedback of the output error to first converter 30.

When first converter 30 is trained, second discriminator 65 and second training unit 66 train second converter 60 by using machine learning in which the third image newly stored in third image storage 21 is reference data and the second image newly stored in second image storage 61 is conversion data (step S90). More specifically, second discriminator 65 outputs an error between the third image and the second image, and second training unit 66 trains second converter 60 by providing feedback of the output error to second converter 60.

When processing in step S90 ends, first training device 1 proceeds to step S20.

In step S20, when non-selected images do not exist (No in step S20), first training device 1 ends the first training processing.

[1-2. First Information Processing Device]

Hereinafter, a first information processing device according to Embodiment 1 will be described. The first information processing device includes first converter 30 and second converter 60 which have been trained in advance by the first training processing performed by first training device 1. When a first image is input to the first information processing device, the first information processing device outputs a second image obtained by performing noise region removal processing on the first image.

First information processing device 2 may be realized by a computer including, for example, a processor and a memory, in a similar manner to first training device 1. In this case, each structural component of first information processing device 2 may be realized by, for example, the processor executing one or more programs stored in the memory. Moreover, first information processing device 2 may be realized by, for example, a plurality of computers, each of which includes a processor and a memory and which can communicate with each other, operating in cooperation. In this case, each structural component of first information processing device 2 may be realized by, for example, any one of the one or more processors executing one or more programs stored in one or more memories. In the description below, first information processing device 2 is realized by, for example, a computer including a processor and a memory.

[1-2-1. Configuration of First Information Processing Device]

Figure 4:
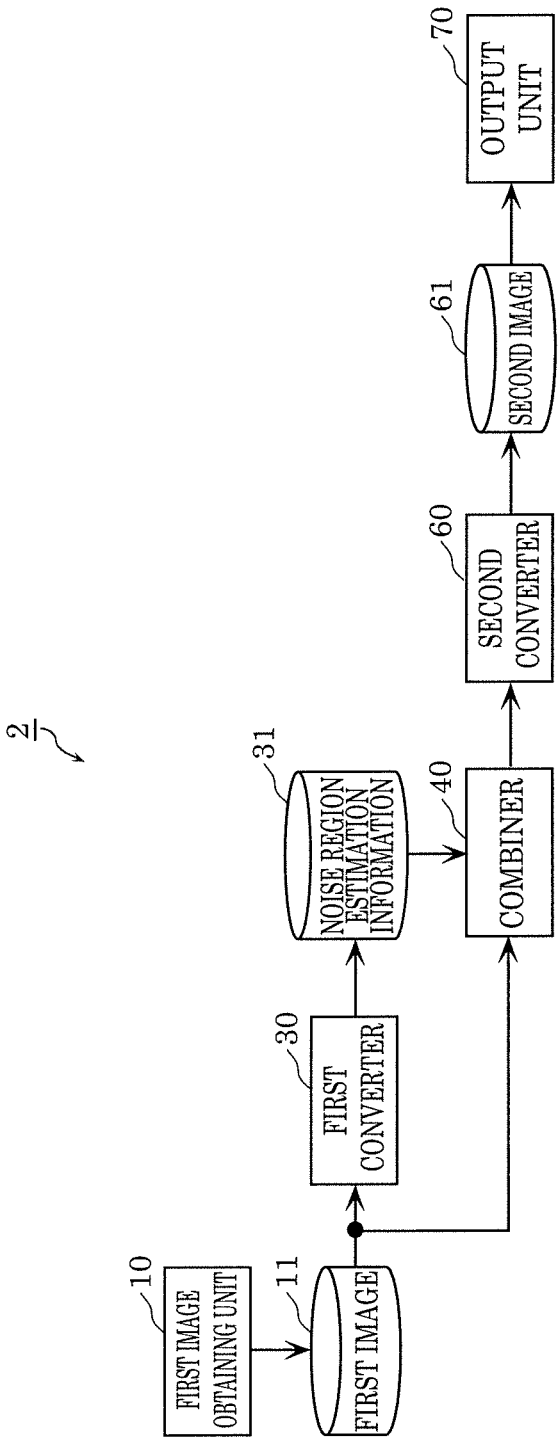
FIG. 4 is a block diagram illustrating a configuration of a first information processing device according to Embodiment 1.

FIG. 4 is a block diagram illustrating a configuration of first information processing device 2 according to Embodiment 1. In the description below, the structural components of first information processing device 2 which are the same as the structural components of first training device 1 have been assigned with the same reference numbers, and the detailed descriptions thereof are omitted, as they have already been described. The differences from first training device 1 will be mainly described.

As illustrated in FIG. 4, first information processing device 2 includes first image obtaining unit 10, first image storage 11, first converter 30, noise region estimation information storage 31, combiner 40, second converter 60, second image storage 61, and output unit 70. Here, first converter 30 and second converter 60 have been trained in advance by the first training processing performed by first training device 1.

Output unit 70 externally outputs the second image stored in second image storage 61.

[1-2-2. Operation of First Information Processing Device]

When the first image is input to first information processing device 2 configured as above, first information processing device 2 performs the first information processing which outputs a second image obtained by performing noise region removal processing on the first image.

Figure 5:
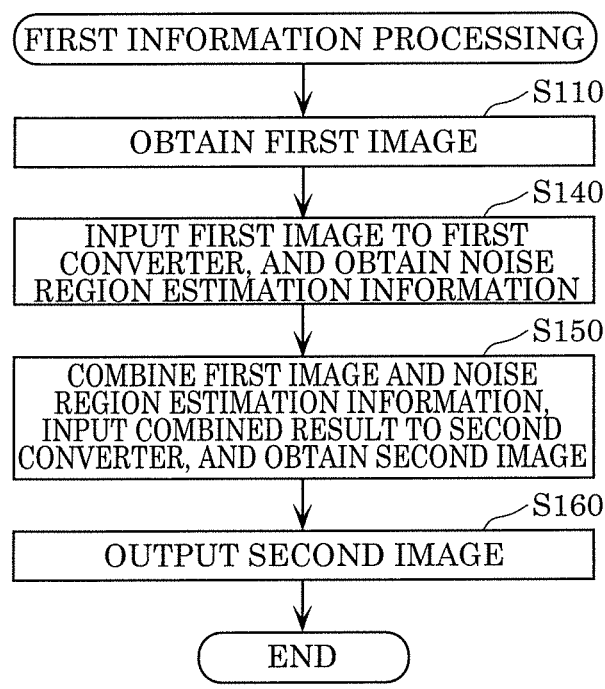
FIG. 5 is a flowchart of first information processing according to Embodiment 1.

FIG. 5 is a flowchart of the first information processing.

The first information processing starts, for example, when an operation for starting the first information processing is performed on first information processing device 2.

When the first information processing starts, first image obtaining unit 10 obtains one first image (step S110). When the first image is obtained, first image storage 11 stores the obtained first image.

When the first image is stored, the first image is input to first converter 30, and first converter 30 outputs noise region estimation information (step S140). When the noise region estimation information is output, noise region estimation information storage 31 stores the output noise region estimation information.

When the noise region estimation information is stored, combiner 40 combines the noise region estimation information and the first image in the channel direction, and inputs the combined result to second converter 60. Second converter 60 then outputs a second image (step S150). When the second image is output, second image storage 61 stores the output second image.

When the second image is stored, output unit 70 externally outputs the second image (step S160).

When processing in step S160 ends, first information processing device 2 ends the first information processing.

[1-3. Consideration]

First training device 1 as configured above is capable of training first converter 30 so as to estimate one or more noise regions in the first image including one or more noise regions, and training second converter 60 so as to output a second image. The second image is an image obtained by performing noise region removal processing on the first image by weighting the noise regions estimated by first converter 30. Accordingly, it is possible to effectively train first converter 30 and second converter 60 so as to remove local noise from an image.

Moreover, according to first information processing device 2 as configured above, first converter 30 trained in advance by the first training processing performed by first training device 1 is capable of estimating one or more noise regions in the first image, and second converter 60 trained in advance by the first training processing performed by first training device 1 is capable of outputting a second image in which the estimated noise regions are weighted.

Hence, first information processing device 2 is capable of effectively removing local noise from an image.

Embodiment 2

[2-1. Second Training Device]

Hereinafter, a second training device according to Embodiment 2 which is configured by modifying part of the structural components of first training device 1 according to Embodiment 1 will be described. The second training device includes a first converter (a first generator or a first denoiser) and a second converter (a second generator or a second denoiser) which are made of machine learning models, in a similar manner to first training device 1. The second training device trains the first converter so as to estimate one or more noise regions in a first image including one or more noise regions, and trains the second converter so as to output a second image. The second image is an image obtained by performing noise region removal processing on the first image by weighting the noise regions estimated by the first converter.

[2-1-1. Configuration of Second Training Device]

Figure 6:
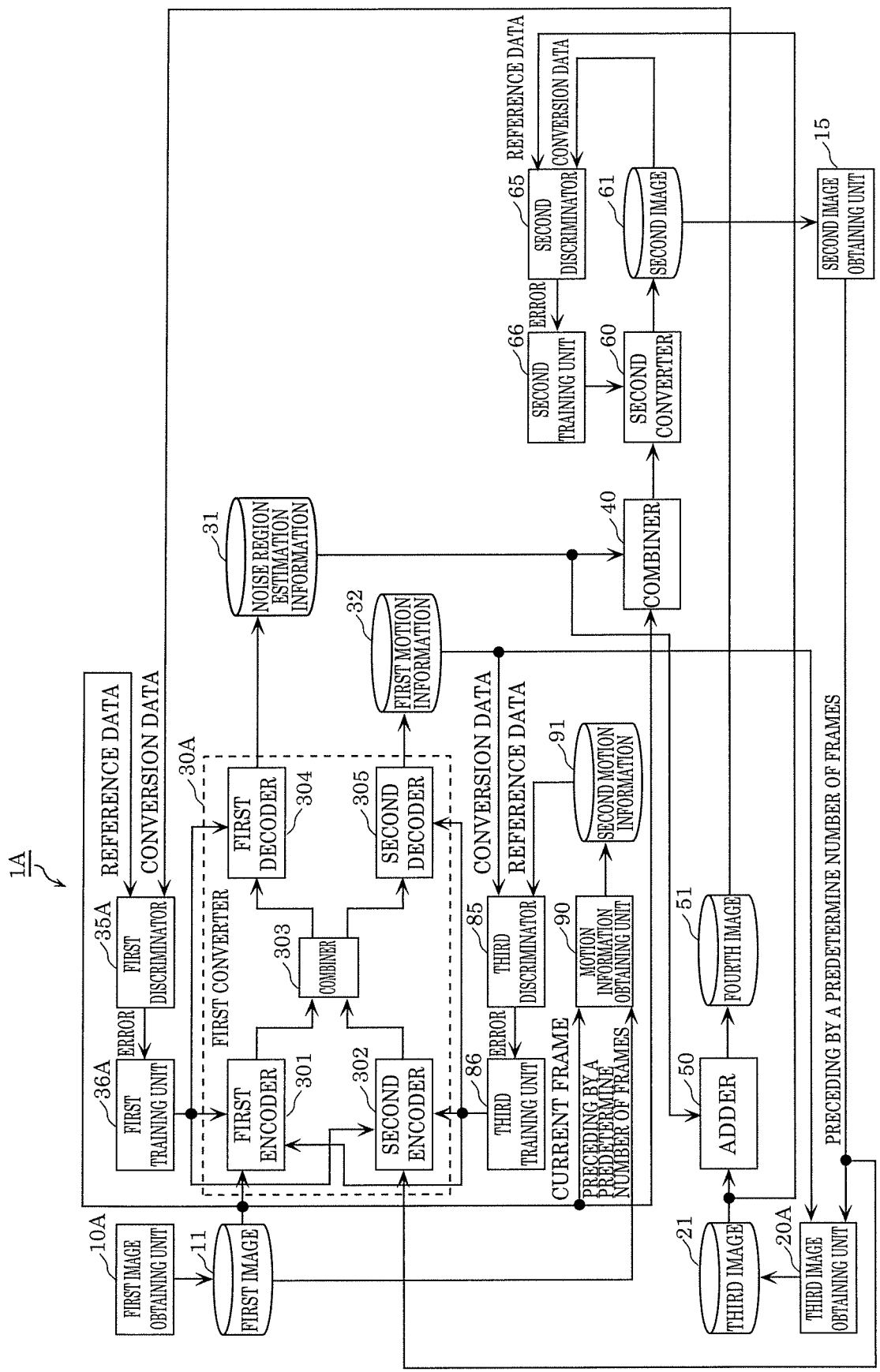
FIG. 6 is a block diagram illustrating a configuration of a second training device according to Embodiment 2.

FIG. 6 is a block diagram illustrating a configuration of second training device 1A according to Embodiment 2. In the description below, the structural components of second training device 1A which are the same as the structural components of first training device 1 have been assigned with the same reference numbers as they have already been described, and the detailed descriptions thereof are omitted. The differences from first training device 1 will be mainly described.

As illustrated in FIG. 6, second training device 1A includes first image obtaining unit 10A, first image storage 11, second image obtaining unit 15, third image obtaining unit 20A, third image storage 21, first converter 30A, noise region estimation information storage 31, first motion information storage 32, first discriminator 35A, first training unit 36A, combiner 40, adder 50, fourth image storage 51, second converter 60, second image storage 61, second discriminator 65, second training unit 66, motion information obtaining unit 90, second motion information storage 91, third discriminator 85, and third training unit 86.

First image obtaining unit 10A obtains a plurality of first images including one or more noise regions. Here, each of the first images forms a moving image including a plurality of frames. The first images may be frame images forming a moving image captured by a video camera, for example. Moreover, the noise regions may be regions including noise caused by substances (for example, raindrops) adhered on the lens or lens cover of the video camera. First image obtaining unit 10A may obtain, for example, the first images from an image capturing device or a recording medium communicatively connected in a wired or wireless manner.

Second image obtaining unit 15 obtains a second image from second image storage 61.

First converter 30A is a machine learning model trained by using machine learning so as to output noise region estimation information indicating the estimated noise regions and first motion information, when the first images and second images preceding the first images by a predetermined number of frames (for example, preceding by one frame) are input to first converter 30A. Here, the noise region estimation information is an image with pixel values of noise components among pixel values of pixels included in the estimated noise regions in the first image. Moreover, here, the first motion information is motion information of the first image relative to the second image preceding the first image by a predetermined number of frames. Here, one first image stored in first image storage 11 and a second image preceding the first image by a predetermined number of frames are input as a pair to first converter 30A. In other words, when the first image is input to first converter 30A, second image obtaining unit 15 obtains a preceding second image to be paired with the input first image from second image storage 15, and inputs the preceding second image to first converter 30A. The preceding second image is an image obtained by processing performed on a preceding first image preceding the input first image by a predetermined number of frames, and is an image preceding the second image by the predetermined number of frames. First converter 30A may be any machine learning model as long as, when the first image and the second image preceding the first image by a predetermined number of frames are input to first converter 30A, first converter 30A is a machine learning model which can be trained so as to output noise region estimation information indicating the estimated noise regions and the first motion information. Here, first converter 30A is a convolutional neural network model.

First converter 30A includes, as functional blocks, first encoder 301, second encoder 302, combiner 303, first decoder 304, and second decoder 305.

First encoder 301 is a functional block trained so as to output the feature amount of the first image, when the first image is input to first encoder 301.

Second encoder 302 is a functional block trained so as to output the feature amount of the second image, when the second image is input to second encoder 302.

Combiner 303 is a functional block which combines, in the channel direction, the feature amount of the first image output from first encoder 301 and the feature amount of the second image output from second encoder 302.

First decoder 304 is a functional block trained so as to output noise region estimation information when the feature amount combined by combiner 303 is input to first decoder 304.

Second decoder 305 is a functional block trained so as to output first motion information when the feature amount combined by combiner 303 is input to second decoder 305.

First motion information storage 32 stores the first motion information output from first converter 30A.

Third image obtaining unit 20A obtains a third image by using the first motion information and a preceding second image preceding the second image by a predetermined number of frames. More specifically, third image obtaining unit 20A obtains the first motion information stored in first motion information storage 32 and a preceding second image obtained by second image obtaining unit 15. The preceding second image is an image preceding the first image corresponding to the first motion information by a predetermined number of frames. Third image obtaining unit 20A then obtains a third image by relocating the preceding second image to the position of the current frame by using the first motion information.

Motion information obtaining unit 90 obtains second motion information by comparing the first image and a preceding first image preceding the first image by a predetermined number of frames. Here, the second motion information refers to motion information of the preceding first image relative to the first image.

Second motion information storage 91 stores the second motion information obtained by motion information obtaining unit 90.

First discriminator 35A is a machine learning model which forms a GAN in which first converter 30A is a generator and first discriminator 35A is a discriminator. When a first image is input to first discriminator 35A as reference data and a fourth image is input to first discriminator 35A as conversion data, first discriminator 35A discriminates each of the first image and the fourth image as true or false as reference data. In other words, the sameness between the first images and the sameness between the fourth image and the first image are classified. It may be that true or false as conversion data is classified instead of as reference data. First discriminator 35A then outputs an error based on the classification result. Moreover, first discriminator 35A is trained by using machine learning based on the classification result. Specifically, when the first image stored in first image storage 11 is input to first discriminator 35A as reference data, first discriminator 35A discriminates the first image as reference data or not. Moreover, when the fourth image stored in fourth image storage 51 and corresponding to the first image is input to first discriminator 35A as conversion data, first discriminator 35A discriminates the fourth image as reference data or not. For example, each classification result is represented by a probability value. First discriminator 35A then outputs an error based on the classification result of the fourth image. First discriminator 35A is trained based on the classification results of the first image and the fourth image. For example, first discriminator 35A outputs, as an error, a value calculated based on the probability that the fourth image is reference data (hereinafter, also referred to as fifth feedback data). Moreover, first discriminator 35A outputs a value calculated based on the probability that the first image is reference data and the probability that the fourth image is reference data (hereinafter, also referred to as sixth feedback data). First discriminator 35A may be any machine learning model as long as, when the first image and the fourth image are input to first discriminator 35A, first discriminator 35A discriminates the sameness between the first image and the fourth image, outputs an error based on the classification result, and is trained based on the classification result. Here, first discriminator 35A is a convolutional neural network model.

First training unit 36A trains first converter 30A by using the fifth feedback data output from first discriminator 35A. Specifically, first training unit 36A provides, to first converter 30A, feedback of the fifth feedback data output from first discriminator 35A. By doing so, first training unit 36A trains first converter 30A so as to output the noise region estimation information indicating one or more estimated noise regions and the first motion information when the first image and a second image preceding the first image by a predetermined number of frames are input to first converter 30A. Here, first training unit 36A trains first converter 30A by providing, to first encoder 301, second encoder 302, and first decoder 304, feedback of the fifth feedback data output from first discriminator 35A. First training unit 36A trains first discriminator 35A by using the sixth feedback data output from first discriminator 35A. Specifically, first training unit 36A provides, to first discriminator 35A, feedback of the sixth feedback data output from first discriminator 35A. By doing so, first training unit 36A trains first discriminator 35A so as to discriminate the first image as reference data and the fourth data as conversion data when the first image and the fourth image are input to first discriminator 35A.

When the second motion information stored in second motion information storage 91 is input to third discriminator 85 as reference data, and the first motion information stored in first motion information storage 32 is input to third discriminator 85 as conversion data, third discriminator 85 outputs an error between the second motion information and the first motion information. The first motion information is information of the frame which is the same as the frame of the second motion information. Third discriminator 85 may be a machine learning model which forms a GAN in which first converter 30A is a generator and third discriminator 85 is a discriminator. However, third discriminator 85 does not have to be a machine learning model which forms a GAN.

Third training unit 86 provides, to first converter 30A, feedback of the error output from third discriminator 85. By doing so, third training unit 86 trains first converter 30A so as to output noise region estimation information indicating the estimated noise regions and the first motion information, when the first image and a second image preceding the first image by a predetermined number of frames are input to first converter 30A. Here, third training unit 86 trains first converter 30A by providing, to first encoder 301, second encoder 302, and second decoder 305, feedback of the error output from third discriminator 85.

[2-1-2. Operation of Second Training Device]

Second training device 1A configured as above performs second training processing. In the second training processing, second training device 1A trains first converter 30A by using machine learning in which the first image is reference data and the fourth image is conversion data, trains second converter 60 by using machine learning in which the third image is reference data and the second image is conversion data, and trains first converter 30A by using machine learning in which the second motion information is reference data and the first motion information is conversion data.

Figure 7:
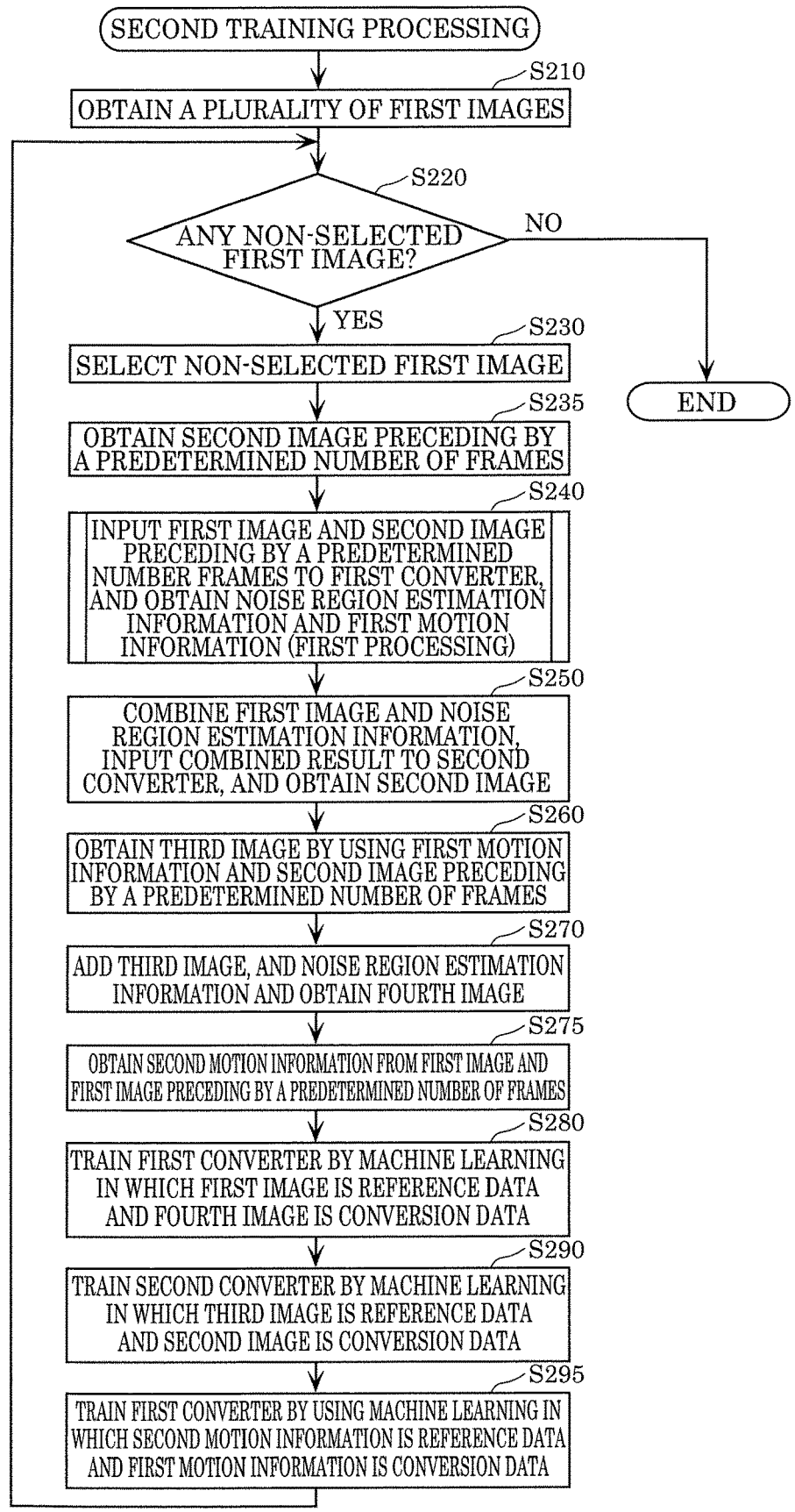
FIG. 7 is a flowchart of second training processing according to Embodiment 2.

FIG. 7 is a flowchart of the second training processing.

The second training processing starts, for example, when an operation for starting the second training processing is performed on second training device 1A.

When the second training processing starts, first image obtaining unit 10A obtains a plurality of first images (step S210). When the first images are obtained, first image storage 11 stores the obtained first images.

When the first images are stored in first image storage 11, first converter 30A checks whether or not non-selected first images exist in the first images stored in first image storage 11 (step S220). Here, the non-selected first images refer to first images which have not yet been selected in the loop processing from step S220 to step S295 to be described later.

When non-selected first images exist in step S220 (Yes in step S220), first converter 30A selects one of the non-selected first images (step S230).

When the non-selected first image is selected, second image obtaining unit 15 obtains, from second image storage 61, a preceding second image preceding the selected first image by a predetermined number of frames (step S235). Here, when the preceding second image has not yet been stored in second image storage 61, second image obtaining unit 15 may, for example, obtain a substitute image as the preceding second image. In this case, for example, second image obtaining unit 15 may obtain the substitute image from an external device, or may obtain the substitute image stored in second image storage 61 in advance from second image storage 61. The substitute image may be any image as long as the image includes a scene corresponding to the preceding second image. For example, the substitute image may be an image obtained by performing CG processing on the second image of the frame other than the preceding second image.

When the preceding second image is obtained, first converter 30A performs first processing in which the selected first image and the obtained preceding second image are input to first converter 30A, and noise region estimation information and the first motion information are output (step S240).

Figure 8:
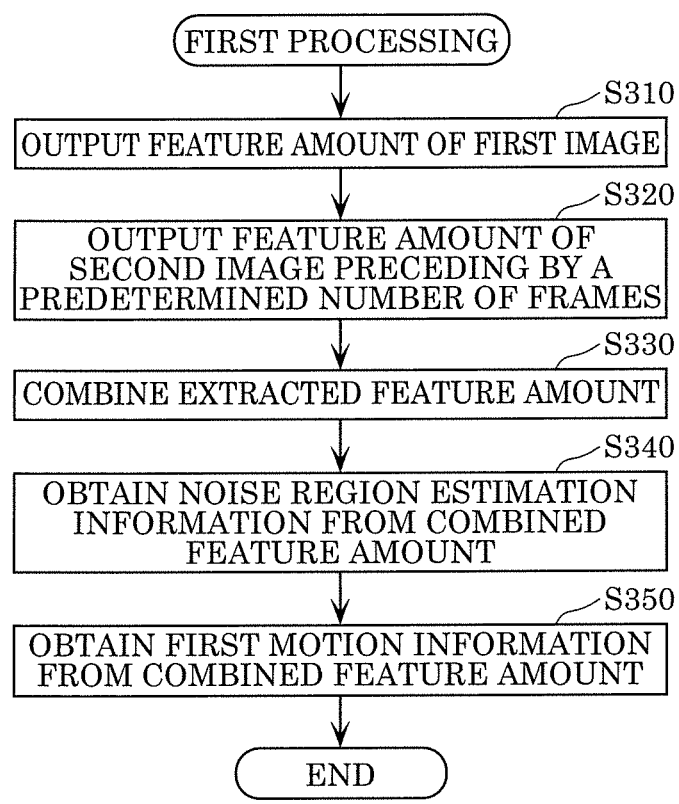
FIG. 8 is a flowchart of first processing according to Embodiment 2.

FIG. 8 is a flowchart of the first processing.

When the first processing starts, first encoder 301 outputs the feature amount of the first image from the first image (step S310).

Second encoder 302 then outputs the feature amount of the preceding second image from the preceding second image (step S320).

When the feature amount of the first image and the feature amount of the preceding second image are output, combiner 303 combines the feature amount of the first image and the feature amount of the preceding second image in the channel direction (step S330).

When the feature amounts are combined, first decoder 304 outputs noise region estimation information based on the combined feature amount (step S340). Noise region estimation information storage 31 then stores the noise region estimation information output from first decoder 304.

Second decoder 305 then outputs the first motion information from the combined feature amount (step S350). First motion information storage 32 then stores the first motion information output from second decoder 305.

When processing in step S350 ends, second training device 1A ends the first processing.

Referring back to FIG. 7, description of the second training processing is continued.

When the noise region estimation information is stored in the first processing, combiner 40 combines the noise region estimation information and the selected first image in the channel direction, and inputs the combined result to second converter 60. Second converter 60 then outputs a second image (step S250). When the second image is output, second image storage 61 stores the output second image.

When the first motion information is stored in the first processing, third image obtaining unit 20A obtains a third image by using the first motion information and a preceding second image preceding the second image by a predetermined number of frames (step S260). When the third image is obtained, third image storage 21 stores the obtained third image.

When the third image is stored, adder 50 generates a fourth image by using the third image, and the noise region estimation information stored in noise region estimation information storage 31 and corresponding to the selected first image (step S270). When the fourth image is output, fourth image storage 51 stores the generated fourth image.

When the fourth image is stored, motion information obtaining unit 90 obtains the second motion information by comparing the selected first image with a preceding first image preceding the selected first image by a predetermined number of frames (step S275). When the second motion information is obtained, second motion information storage 91 stores the obtained second motion information.

When the second motion information is stored, first discriminator 35A and first training unit 36A train first converter 30A by using machine learning in which the selected first image is reference data and the fourth image newly stored in fourth image storage 51 is conversion data (step S280). More specifically, first discriminator 35A outputs an error between the first image and the fourth image, and first training unit 36A trains first converter 30A by providing feedback of the output error to first encoder 301, second encoder 302, and first decoder 304.

When first discriminator 35A is trained, second discriminator 65 and second training unit 66 train second converter 60 by using machine learning in which the third image newly stored in third image storage 21 is reference data and the second image newly stored in second image storage 61 is conversion data (step S290). More specifically, second discriminator 65 outputs an error between the third image and the second image, and second training unit 66 trains second converter 60 by providing feedback of the output error to second converter 60.

When second converter 60 is trained, third discriminator 85 and third training unit 86 train first converter 30A by using machine learning in which the second motion information newly stored in second motion information storage 91 is reference data and the first motion information newly stored in first motion information storage 32 is conversion data (step S295). More specifically, third discriminator 85 outputs an error between the second motion information and the first motion information, and third training unit 86 trains first converter 30A by providing feedback of the output error to first encoder 301, second encoder 302, and second decoder 305.

When the processing in step S295 ends, second training device 1A proceeds to step S220.

In step S220, when non-selected first images do not exist (No in step S220), second training device 1A ends the second training processing.

[2-2. Second Information Processing Device]

Hereinafter, a second information processing device according to Embodiment 2 which is configured by modifying part of the structural components of first information processing device 2 according to Embodiment 1 will be described. In a similar manner to the first information processing device, the second information processing device includes first converter 30A and second converter 60 which have been trained in advance by the second training processing performed by second training device 1A. When a first image is input to the second information processing device, the second information processing device outputs a second image obtained by performing noise region removal processing on the first image.

[2-2-1. Configuration of Second Information Processing Device]

Figure 9:
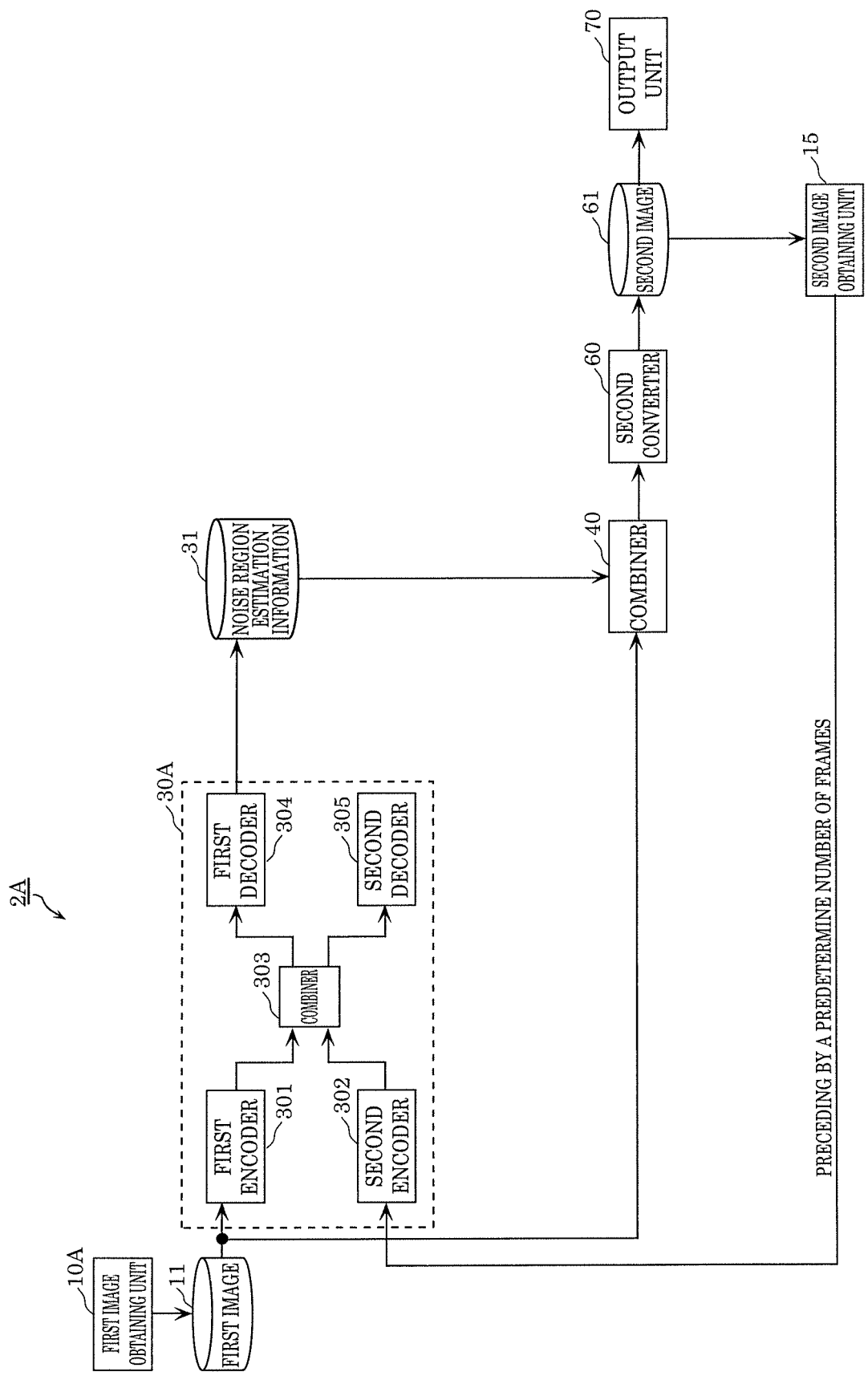
FIG. 9 is a block diagram illustrating a configuration of a second information processing device according to Embodiment 2.

FIG. 9 is a block diagram illustrating a configuration of second information processing device 2A according to Embodiment 2. In the description below, the structural components of second information processing device 2A which are the same as the structural components of second training device 1A or first information processing device 2 have been assigned with the same reference numbers, as they have already been described, and the detailed descriptions thereof are omitted. The differences from second training device 1A and first information processing device 2 will be mainly described.

As illustrated in FIG. 9, second information processing device 2A includes first image obtaining unit 10A, first image storage 11, first converter 30A, noise region estimation information storage 31, combiner 40, second converter 60, second image obtaining unit 15, second image storage 61, and output unit 70. Here, first converter 30A and second converter 60 have been trained in advance by the second training processing performed by second training device 1A.

[2-2-2. Operation of Second Information Processing Device]

When a first image is input to second information processing device 2A configured as above, second information processing device 2A performs the second information processing which outputs a second image obtained by performing noise region removal processing on the first image.

Figure 10:
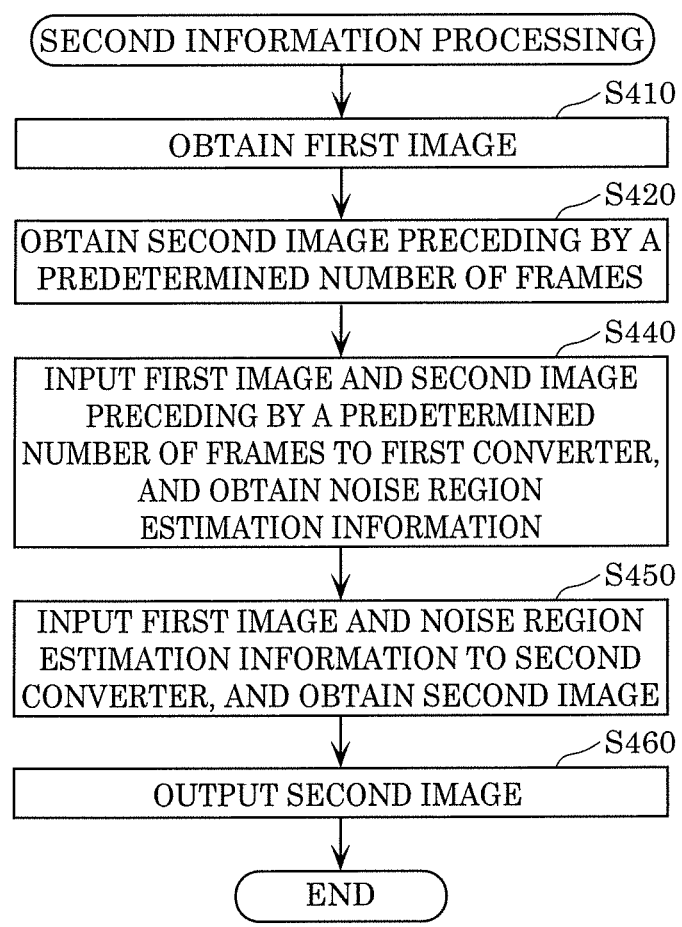
FIG. 10 is a flowchart of second information processing according to Embodiment 2.

FIG. 10 is a flowchart of the second information processing.

In the second information processing, the processing in step S450 to step S460 are the same as the processing in step S150 to step S160 in the first information processing according to Embodiment 1. Accordingly, as the processing in step S450 to step S460 has already been described, the detailed description thereof is omitted. Processing in step S410 to step S440 will be mainly described.

The second information processing starts, for example, when an operation for starting the second information processing is performed on second information processing device 2A.

When the first information processing starts, first image obtaining unit 10A obtains one first image (step S410). When the first image is obtained, first image storage 11 stores the obtained first image.

When the first image is obtained, second image obtaining unit 15 obtains a preceding second image preceding the first image by a predetermined number of frames (step S420).

When the first image and the preceding second image are obtained, first converter 30A inputs the first image and the preceding second image to first converter 30A, and outputs noise region estimation information (step S440). When the noise region estimation information is output, noise region estimation information storage 31 stores the output noise region estimation information.

When the processing in step S440 ends, second information processing device 2A proceeds to step S450. When the processing in step S460 ends, second information processing device 2A ends the second information processing.

[2-3. Consideration]

In a similar manner to first training device 1 according to Embodiment 1, second training device 1A configured as above is capable of training first converter 30A so as to estimate one or more noise regions in a first image, and training second converter 60 so as to output a second image in which the noise regions in the first image estimated by first converter 30A are weighted. Accordingly, it is possible to effectively train first converter 30A and second converter 60 so as to remove local noise from an image. Moreover, according to second training device 1A configured as above, it is possible to obtain information hidden by noise influence in one first image from another first image by using motion information. Accordingly, it is possible to effectively train first converter 30B and second converter 60 so as to remove local noise from an image. Moreover, according to second training device 1A configured as above, a user of second training device 1A does not need to prepare a third image in advance. Hence, the user of second training device 1A is capable of training first converter 30A and second converter 60 without preparing the third image in advance.

Moreover, in a similar manner to first information processing device 2 according to Embodiment 1, with second information processing device 2A as configured above, first converter 30A trained in advance by the second training processing performed by second training device 1A is capable of estimating one or more noise regions in a first image, and second converter 60 trained in advance by the first training processing performed by second training device 1A is capable of outputting a second image in which the estimated noise regions are weighted.

Accordingly, in a similar manner to first information processing device 2 according to Embodiment 1, second information processing device 2A is capable of effectively removing local noise from an image.

Embodiment 3

[3-1. Third Training Device]

Hereinafter, a third training device according to Embodiment 3 which is configured by modifying part of the structural components of second training device 1A according to Embodiment 2 will be described. The third training device includes a first converter (a first generator or a first denoiser) made of a machine learning model, and trains the first converter so as to output a second image. The second image is an image obtained by performing noise region removal processing on the first image including one or more noise regions.

[3-1-1. Configuration of Third Training Device]

Figure 11:
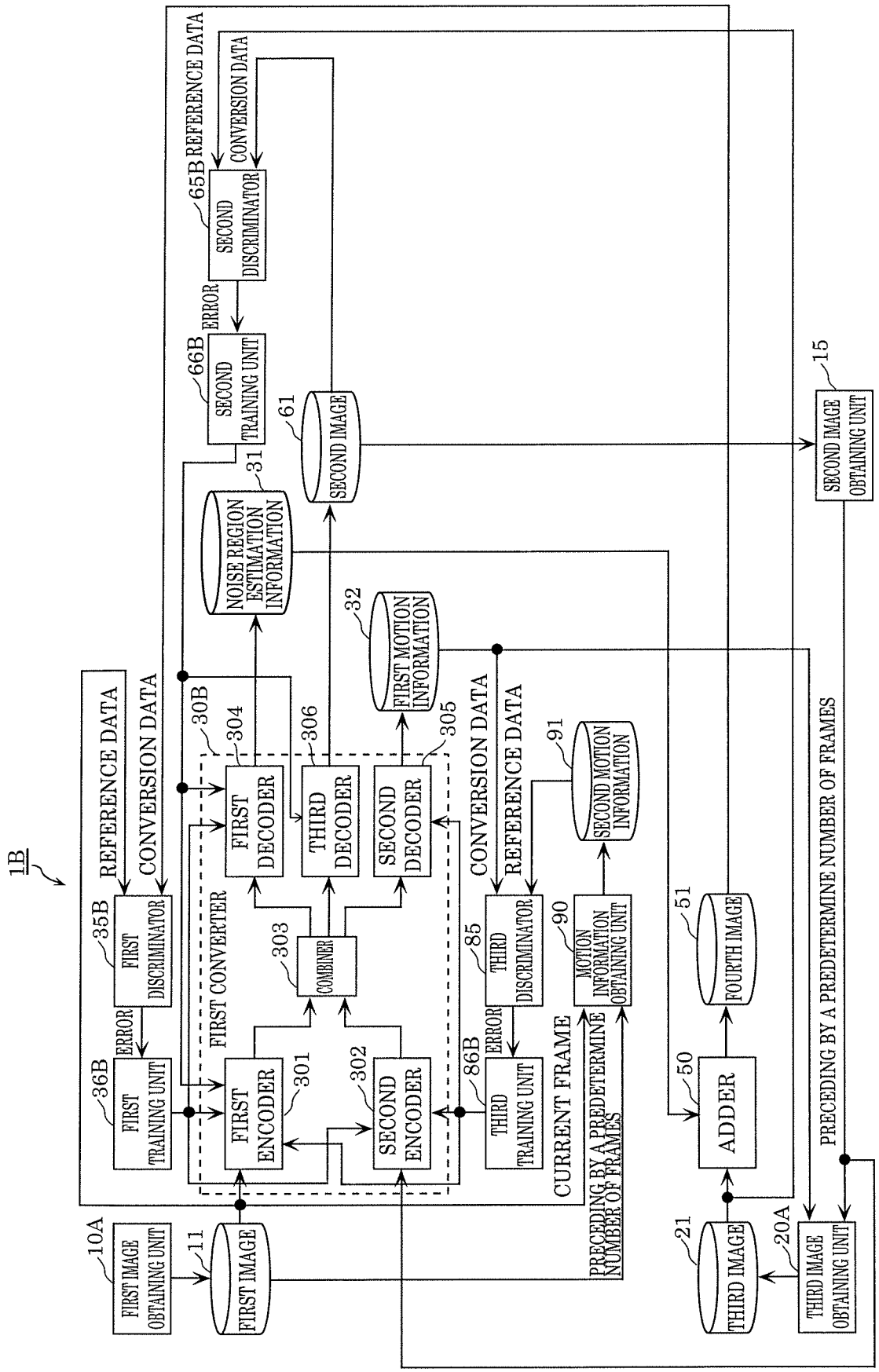
FIG. 11 is a block diagram illustrating a configuration of a third training device according to Embodiment 3.

FIG. 11 is a block diagram illustrating a configuration of third training device 1B according to Embodiment 3. In the description below, the structural components of third training device 1B which are the same as the structural components of second training device 1A and first training device 1 according to Embodiment 1 have been assigned with the same reference numbers, as they have already been described, and the detailed descriptions thereof are omitted. The differences from second training device 1A and first training device 1 will be mainly described.

As illustrated in FIG. 11, third training device 1B includes first image obtaining unit 10A, first image storage 11, second image obtaining unit 15, third image obtaining unit 20A, third image storage 21, first converter 30B, noise region estimation information storage 31, first motion information storage 32, first discriminator 35B, first training unit 36B, adder 50, fourth image storage 51, second image storage 61, second discriminator 65B, second training unit 66B, motion information obtaining unit 90, second motion information storage 91, third discriminator 85, and third training unit 86B.

First converter 30B is a machine learning model trained by using machine learning so as to output, when a first image and a preceding second image preceding the first image by a predetermined number of frames (for example, by one frame) are input to first converter 30B, noise region estimation information indicating the estimated noise regions, a second image, and first motion information. Here, the noise region estimation information is an image with pixel values of noise components among pixel values of pixels included in the estimated noise regions in the first image. Moreover, here, the first motion information is motion information of the first image relative to the preceding second image. Here, one first image stored in first image storage 11 and a second image preceding the first image by a predetermined number of frames are input to first converter 30B as a pair. In other words, when the first image is input to first converter 30B, second image obtaining unit 15 obtains a second image to be paired with the first image from second image storage 15, and inputs the obtained second image to first converter 30B. The second image is an image obtained by the processing performed on a preceding first image preceding the input first image by a predetermined number of frames. First converter 30A may be any machine learning model as long as the machine learning model can be trained so as to output noise region estimation information indicating the estimated noise regions, the second image, and the first motion information, when the first image and the second image preceding the first image by a predetermined number of frames are input to first converter 30A. Here, first converter 30B is a convolutional neural network model.

First converter 30B includes, as functional blocks, first encoder 301, second encoder 302, combiner 303, first decoder 304, second decoder 305, and third decoder 306.

Third decoder 306 is a functional block trained so as to output a second image when the feature amount combined by combiner 303 is input to third decoder 306.

First discriminator 35B is a machine learning model which forms a GAN in which first converter 30B is a generator and first discriminator 35B is a discriminator. When the first image is input to first discriminator 35B as reference data and the fourth image is input to first discriminator 35B as conversion data, first discriminator 35B discriminates each of the first image and the fourth image as true or false as reference data. In other words, the sameness between the first images and the sameness between the fourth image and the first image are classified. It may be that true or false as conversion data is classified instead of as reference data. First discriminator 35B then outputs an error based on the classification result. Moreover, first discriminator 35B is trained by using machine learning based on the classification result. Specifically, when the first image stored in first image storage 11 is input to first discriminator 35B as reference data, first discriminator 35B discriminates the first image as reference data or not. Moreover, when the fourth image stored in fourth image storage 51 and corresponding to the first image is input to first discriminator 35B as conversion data, first discriminator 35B discriminates the fourth image as reference data or not. For example, each classification result is represented by a probability value. First discriminator 35B then outputs an error based on the classification result of the fourth image. First discriminator 35B is trained based on the classification results of the first image and the fourth image. For example, first discriminator 35B outputs, as an error, a value (hereinafter, also referred to as seventh feedback data) calculated based on the probability that the fourth image is reference data. Moreover, first discriminator 35B outputs a value (hereinafter, also referred to as eighth feedback data) calculated based on the probability that the first image is reference data and the probability that the fourth image is reference data. First discriminator 35B may be any machine learning model as long as, when the first image and the fourth image are input to first discriminator 35B, first discriminator 35B discriminates the sameness between the first image and the fourth image, outputs an error based on the classification result, and is trained based on the classification result. Here, first discriminator 35B is a convolutional neural network model.

First training unit 36B trains first converter 30B by using the seventh feedback data output from first discriminator 35B. Specifically, first training unit 36B provides, to first converter 30B, feedback of the seventh feedback data output from first discriminator 35B. By doing so, first training unit 36B trains first converter 30B so as to output noise region estimation information indicating the estimated noise regions, the second image, and the first motion information, when the first image and a second image preceding the first image by a predetermined number of frames are input to first converter 30B. Here, first training unit 36B trains first converter 30B by providing, to first encoder 301, second encoder 302, and first decoder 304, feedback of the seventh feedback data output from first discriminator 35B. First training unit 36B trains first discriminator 35B by using the eighth feedback data output from first discriminator 35B. Specifically, first training unit 36B provides, to first discriminator 35B, feedback of the eighth feedback data output from first discriminator 35. By doing so, first training unit 36B trains first discriminator 35B so as to discriminate that the first image is reference data and the fourth image is conversion data when the first image and the fourth image are input to first discriminator 35B.

Second discriminator 65B is a machine learning model which forms a GAN in which first converter 30B is a generator and second discriminator 65B is a discriminator. Second discriminator 65B discriminates each of the third image and the second image as true or false as reference data, when the third image is input to second discriminator 65B as reference data and the second image is input to second discriminator 65B as conversion data. In other words, the sameness between the third images and the sameness between the second image and the third image are classified. It may be that true or false as conversion data is classified instead of as reference data. Second discriminator 65B then outputs an error based on the classification result. Moreover, second discriminator 65B is trained by using machine learning based on the classification result. Specifically, when the third image stored in third image storage 21 is input to second discriminator 65B as reference data, second discriminator 65B discriminates the third image as reference data or not. Moreover, when the second image stored in second image storage 61 and corresponding to the third image is input to second discriminator 65B as conversion data, second discriminator 65B discriminates the second image as reference data or not. For example, each classification result is represented by a probability value. Second discriminator 65B then outputs an error based on the classification result of the second image. Second discriminator 65B is trained based on the classification results of the third image and the second image. For example, second discriminator 65B outputs, as an error, a value (hereinafter, also referred to as ninth feedback data) calculated based on the probability that the second image is reference data. Second discriminator 65B also outputs a value (hereinafter, also referred to as tenth feedback data) calculated based on the probability that the third image is reference data and the probability that the second image is reference data. Second discriminator 65B may be any machine learning model as long as, when the third image and the second image are input to second discriminator 65B, second discriminator 65B discriminates the sameness between the third image and the second image, outputs an error based on the classification result, and is trained based on the classification result. Here, second discriminator 65B is a convolutional neural network model.

Second training unit 66B trains first converter 30B by using the ninth feedback data output from second discriminator 65B. Specifically, second training unit 66 provides, to first converter 30B, feedback of the ninth feedback data output from second discriminator 65. By doing so, second training unit 66 trains first converter 30B so as to output noise region estimation information indicating the estimated noise regions, a second image, and the first motion information when the first image and a second image preceding the first image by a predetermined number of frames are input to first converter 30B. Here, second training unit 66B trains first converter 30B by providing, to first encoder 301, second encoder 302, and third decoder 306, feedback of the ninth feedback data output from second discriminator 65B. Second training unit 66B trains second discriminator 65B by using the tenth feedback data output from second discriminator 65B. Specifically, second training unit 66B provides, to second discriminator 65B, feedback of the tenth feedback data output from second discriminator 65B. By doing so, second training unit 66B trains second discriminator 65B so as to discriminate that the third image is reference data and the second image is conversion data when the third image and the second image are input to second discriminator 65B.

Third training unit 86B trains first converter 30B by providing, to first converter 30B, feedback of the error output from third discriminator 85 so as to output noise region estimation information indicating the estimated noise regions, the second image, and the first motion information when the first image and a second image which precedes the first image by a predetermined number of frames are input to first converter 30B. Here, third training unit 86B trains first converter 30B by providing feedback of the errors output from third discriminator 85 to first encoder 301, second encoder 302, and second decoder 305.

[3-1-2. Operation of Third Training Device]

Third training device 1B configured as above performs third training processing. In the third training processing, third training device 1B trains first converter 30B by using machine learning in which the first image is reference data and the fourth image is conversion data, trains first converter 30B by using machine learning in which the third image is reference data and the second image is conversion data, and trains first converter 30B by using machine learning in which the second motion information is reference data and the first motion information is conversion data.

Figure 12:
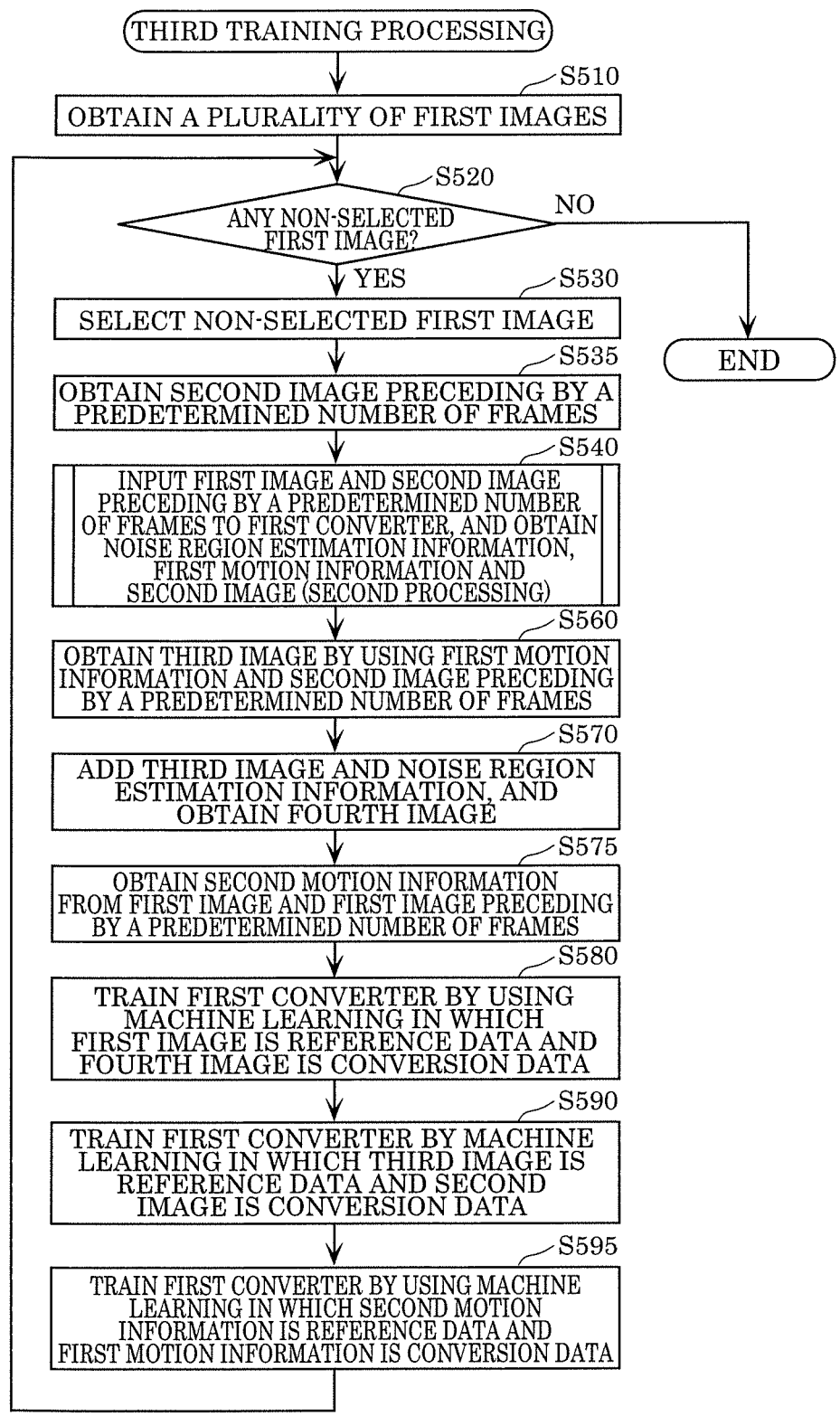
FIG. 12 is a flowchart of third training processing according to Embodiment 3.

FIG. 12 is a flowchart of the third training processing.

In the third training processing, processing in steps S510 to S535, steps S560 to S580, and step S595 are respectively the same as the processing in step S210 to step S235, step S260 to step S280, and step S295 in the second training processing according to Embodiment 2, where first converter 30A is replaced with first converter 30B, first discriminator 35A is replaced with first discriminator 35B, and first training unit 36A is replaced with first training unit 36B, and third training unit 86A is replaced with third training unit 86B. Hence, here, processing in steps S510 to step S535, step S560 to step S580, and step S595 have already been described, and thus, the detailed description thereof is omitted. Processing in step S540 and step S590 will be mainly described.

The third training processing starts, for example, when an operation for starting the third training processing is performed on third training device 1B.

When the processing in step S535 ends, first converter 30B performs second processing in which the selected first image and the obtained second image preceding the second image by a predetermined number of frames are input to first converter 30B, and noise region estimation information, the second image, and the first motion information are output (step S540).

Figure 13:
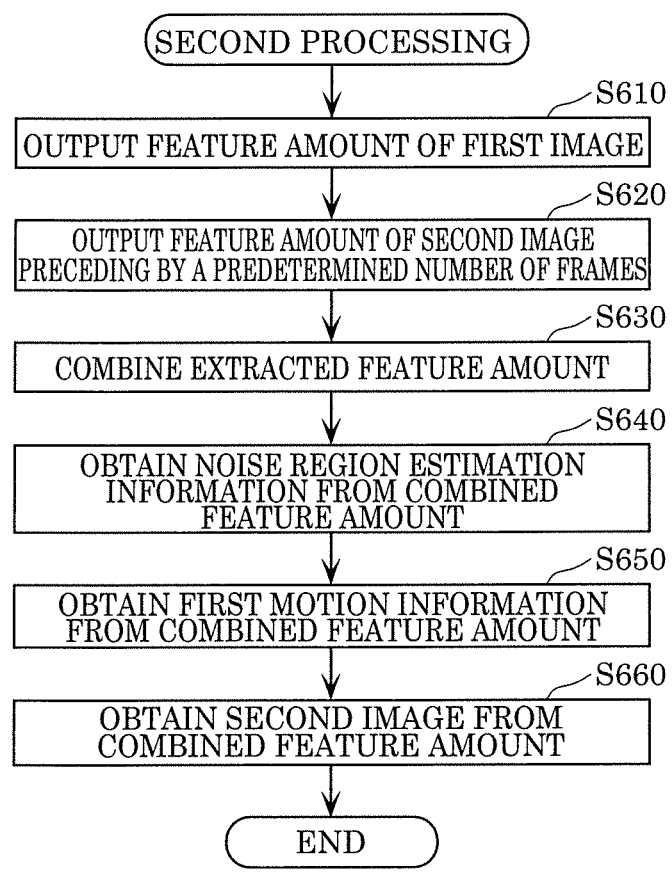
FIG. 13 is a flowchart of second processing according to Embodiment 3.

FIG. 13 is a flowchart of the second processing.

In the second processing, processing in step S610 to step S650 are respectively the same as the processing in step S310 to step S350 in the first processing according to Embodiment 2. Accordingly, as the processing in step S610 to S650 has already been described, the description thereof is omitted. Processing in step S660 will be mainly described.

When the processing in step S650 ends, third decoder 306 outputs a second image based on the combined feature amount (step S660). Second image storage 61 then stores the second image output from third decoder 306.

When the processing in step S660 ends, third training device 1B ends the second processing.

Referring back to FIG. 12, description of the third training processing is continued.

When the second processing ends, third training device 1B proceeds to the processing in step S560.

When the processing in step S580 ends, second discriminator 65B and second training unit 66B train first converter 30B by using machine learning in which the third image newly stored in third image storage 21 is reference data and the second image newly stored in second image storage 61 is conversion data (step S590). More specifically, second discriminator 65B outputs an error between the third image and the second image, and second training unit 66B trains first converter 30B by providing feedback of the output error to first encoder 301, second encoder 302, and first decoder 304.

When the processing in step S590 ends, third training device 1B proceeds to step S595.

In step S520, when non-selected first images do not exist (No in step S520), third training device 1B ends the third training processing.

[3-2. Third Information Processing Device]

Hereinafter, a third information processing device according to Embodiment 3 which is configured by modifying part of the structural components of second information processing device 2A according to Embodiment 2 will be described. The third information processing device includes first converter 30B trained in advanced by the third training processing performed by third training device 1B. When a first image is input to the third information processing device, the third information processing device outputs a second image obtained by performing noise region removal processing on the first image.

[3-2-1. Configuration of Third Information Processing Device]

Figure 14:
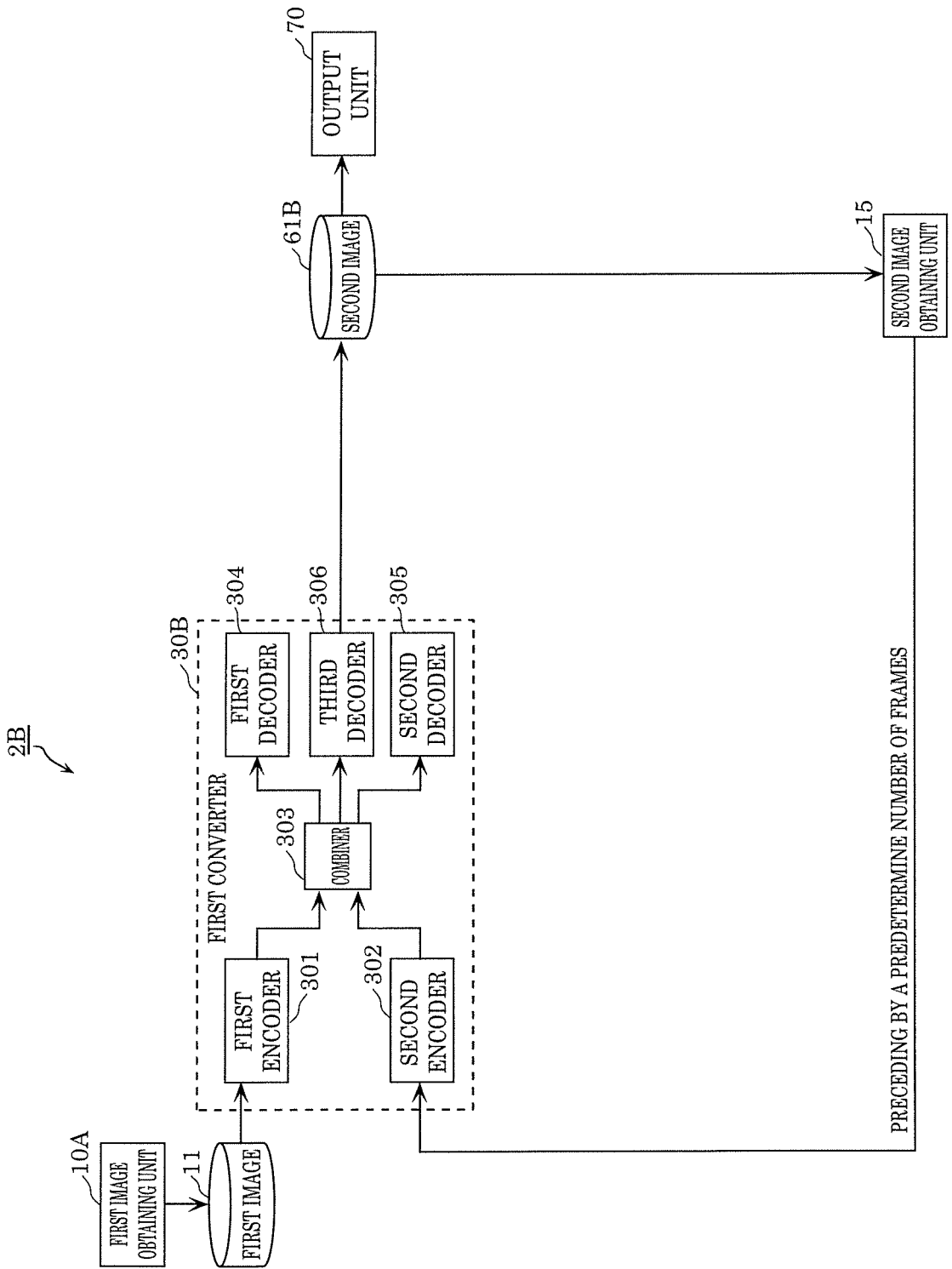
FIG. 14 is a block diagram illustrating a configuration of a third information processing device according to Embodiment 3.

FIG. 14 is a block diagram illustrating a configuration of third information processing device 2B according to Embodiment 3. In the description below, the structural components of third information processing device 2B which are the same as the structural components of third training device 1B and second information processing device 2A have been assigned with the same reference numbers, as they have already been described, and the detailed descriptions thereof are omitted. The differences from third training device 1B and second information processing device 2A will be mainly described.

As illustrated in FIG. 14, third information processing device 2B includes first image obtaining unit 10A, first image storage 11, second image obtaining unit 15, first converter 30B, second image storage 61B, and output unit 70. Here, first converter 30B is trained in advance by the third training processing performed by third training device 1B.

[3-2-2. Operation of Third Information Processing Device]

When a first image is input to third information processing device 2B configured as above, third information processing device 2B performs third information processing which outputs a second image obtained by performing noise region removal processing on the first image.

Figure 15:
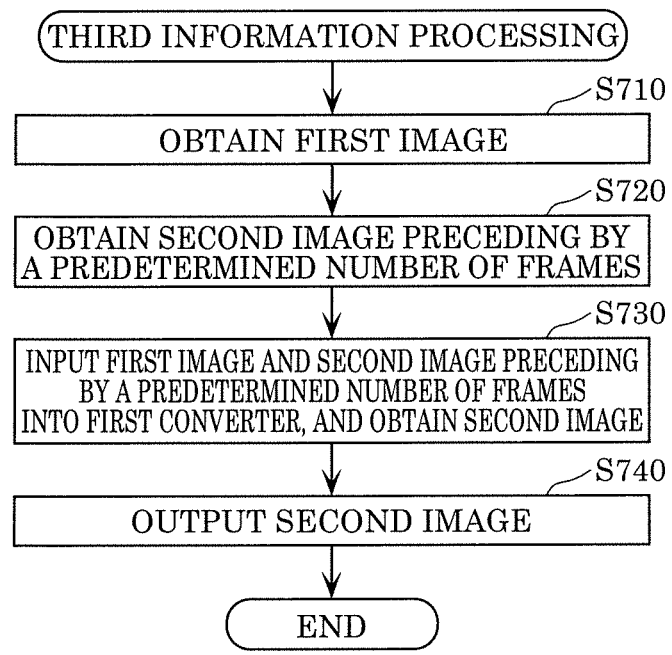
FIG. 15 is a flowchart of third information processing according to Embodiment 3.

FIG. 15 is a flowchart of the third information processing.

In the third information processing, processing in step S710 to step S720 are respectively the same as the processing in step S410 to step S420 in the second information processing according to Embodiment 2. Accordingly, as the processing in step S710 to step S720 has already been described, the detailed description thereof is omitted. Processing in step S730 to step S740 will be mainly described.

The third information processing starts, for example, when an operation for starting the third processing is performed on third information processing device 2B.

When the first image is obtained in step S710 and a preceding second image preceding the second image by a predetermined number of frames is obtained in step S720, first converter 30B inputs the first image and the preceding second image to first converter 30B, and outputs a second image (step S730). When the second image is output, second image storage 61 stores the output second image.

When the second image is stored, output unit 70 externally outputs the second image (step S740).

When the processing in step S740 ends, third information processing device 2B ends the third information processing.

[3-3. Consideration]

Third training device 1B as configured above is capable of training first converter 30B so as to estimate one or more noise regions in a first image, and training first converter 30B so as to output a second image in which the noise regions in the first image estimated by first converter 30B are weighted. Accordingly, it is possible to effectively train first converter 30B so as to remove local noise from an image. Moreover, according to third training device 1B configured as above, information hidden by noise influence in one first image can be obtained from another first image by using motion information. Accordingly, it is possible to effectively train first converter 30B so as to remove local noise from an image. Moreover, according to third training device 1B configured as above, a user of third training device 1B does not need to prepare a third image in advance. Hence, the user of third training device 1B is capable of training first converter 30B without preparing the third image in advance.

Moreover, in third information processing device 2B as configured above, first converter 30B trained in advance by the third training processing performed by third training device 1B is capable of outputting the second image based on the first image.

Accordingly, in a similar manner to first information processing device 2 according to Embodiment 1 and second information processing device 2A according to Embodiment 2, third information processing device 2B is capable of effectively removing local noise from an image.

Supplemental Information

The training device and the information processing device according to one or more aspects of the present disclosure have been described based on Embodiment 1 to Embodiment 3. However, the present disclosure is not limited to the embodiments. It is understood that forms obtained by various modifications to the embodiments that can be conceived by a person of skill in the art as well as forms realized by arbitrarily combining structural components in different embodiments which are within the scope of the essence of the present disclosure are included in one or more aspects of present disclosure.

(1) In Embodiment 1, as a first image, an image including noise caused by substances adhered on the lens or the lens cover of the camera (for example, raindrops) is illustrated as an example. However, the first image is not limited to the above example as long as the image includes noise. For example, the first image may be an image including noise caused by fog being generated when the image is captured.

(2) In Embodiment 2, it has been described that motion information obtaining unit 90 obtains second motion information by comparing a first image and a preceding first image preceding the first image by a predetermined number of frames. In contrast, in another example, motion information obtaining unit 90 may externally obtain the second motion information generated in advance by an external device.

(3) In Embodiment 2, it has been described that the selected first image and the first image preceding the selected first image by a predetermined number of frames are used as a basis for image comparison for obtaining the first motion information and the second motion information. In contrast, in another example, the images used for image comparison may be the selected first image and the first image preceding the selected first image by n-frames (where n is an integral number greater than or equal to 1). The value of n may vary according to the selected first image. In this case, the value of n may be determined according to the motion of an object included in the first image, for example. More specifically, the value of n may be determined so as to increase when the motion of the object decreases, for example.

(4) A portion or all of the structural components of each of the training devices and the information processing devices may be configured from one system large scale integration (LSI). A system LSI is a super-multifunction LSI manufactured with a plurality of components integrated on a single chip, and specifically is a computer system configured of a microprocessor, a read only memory (ROM), and a random access memory (RAM), for example. A computer program is stored in the ROM. The system LSI achieves its function as a result of the microprocessor operating according to the computer program.

It should be noted that the term system LSI was used as an example, but depending on the degree of integration, IC, LSI, super LSI, and ultra LSI are also used. Moreover, the method of circuit integration is not limited to LSI. Integration may be realized with a specialized circuit or a general purpose processor. A Field Programmable Gate Array (FPGA) or a reconfigurable processor that allows reconfiguration of the connection or configuration of the inner circuit cells of the LSI circuit can be used after production of the LSI.

Moreover, when advancement in semiconductor technology or derivatives of other technologies brings forth a circuit integration technology which replaces LSI, it will be appreciated that such a circuit integration technique may be used to integrate the functional blocks. Application of biotechnology is also a possibility.

(5) An aspect of the present disclosure may be not only such training devices and information processing devices, but also an information processing method including the characteristic structural components included in the training devices and the information processing devices as steps. Moreover, an aspect of the present disclosure may be a computer program which causes a computer to execute each characteristic step included in the information processing method. Moreover, an aspect of the present disclosure may be a non-transitory computer-readable recording medium on which such a computer program is recorded.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to, for example, a device which performs processing for removing noise from an image.

What is claimed is:

1. An information processing method performed by a computer, the information processing method comprising:
    obtaining a first image including a noise region;
    obtaining noise region estimation information indicating the noise region which is estimated, the noise region estimation information being output from a first converter as a result of the first image being input to the first converter;
    obtaining a second image on which noise region removal processing has been performed, the second image being output from a second converter as a result of the noise region estimation information and the first image being input to the second converter;
    obtaining a third image which does not include the noise region, the third image including a scene identical to or corresponding to a scene included in the first image;
    generating a fourth image by using the noise region estimation information and the third image, the fourth image including the noise region which is estimated;
    training the first converter by using machine learning in which the first image is reference data and the fourth image is conversion data; and
    training the second converter by using machine learning in which the third image is reference data and the second image is conversion data.

2. The information processing method according to claim 1, further comprising:
    obtaining a preceding second image obtained by processing performed on a preceding first image which precedes the first image by a predetermined number of frames, the preceding second image preceding the second image by the predetermined number of frames;
    obtaining first motion information, the first motion information being output from the first converter as a result of the first image and the preceding second image being input to the first converter;
    obtaining the third image by using the first motion information and the preceding second image;
    obtaining second motion information by comparing the first image with the preceding first image; and
    training the first converter by using machine learning in which the second motion information is reference data and the first motion information is conversion data.

3. The information processing method according to claim 2, further comprising
    obtaining the noise region estimation information, the noise region estimation information being output from the first converter as a result of the first image and the preceding second image being input to the first converter.

4. The information processing method according to claim 1,
    wherein feedback data used for training the first converter is output from a first discriminator as a result of the first image and the fourth image being input to the first discriminator, the first discriminator being trained by using machine learning so as to discriminate an input image as conversion data of the first converter or not, or discriminate the input image as reference data or not, and
    feedback data used for training the second converter is output from a second discriminator as a result of the second image and the third image being input to the second discriminator, the second discriminator being trained by using machine learning so as to discriminate an input image as conversion data of the second converter or not, or discriminate the input image as reference data or not.

5. The information processing method according to claim 1,
    wherein each of the first converter and the second converter is a neural network model.

6. An information processing method performed by a computer, the information processing method comprising:
    obtaining a first image including a noise region and a preceding second image, the preceding second image being obtained by processing performed on a preceding first image preceding the first image by a predetermined number of frames, the preceding second image preceding a second image by the predetermined number of frame, the second image being an image on which noise removal processing has been performed;
    obtaining the second image and first motion information which are output from a first converter as a result of the first image and the preceding second image being input to the first converter;
    obtaining a third image by using the first motion information and the preceding second image; and
    training the first converter by using machine learning in which the third image is reference data and the second image is conversion data.

7. The information processing method according to claim 1,
    wherein the first image is an image captured by a camera, and
    the noise region is a region including noise caused by a substance adhered on one of a lens and a lens cover of the camera.

8. An information processing device comprising:
    a processor; and
    a memory,
    wherein the memory stores a first converter and a second converter, and
    the processor:
        obtains a first image including a noise region from an image capturing device;

obtains noise region estimation information indicating the noise region which is estimated, the noise region estimation information being output from the first converter as a result of the first image being input to the first converter;

obtains a second image on which noise region removal processing has been performed, the second image being output from the second converter as a result of the noise region estimation information and the first image being input to the second converter; and outputs the second image obtained, the first converter is trained by using machine learning in which a fourth image is conversion data and the first image is reference data, the fourth image including the noise region which is estimated, the fourth image being generated by using the noise region estimation information and a third image which does not include the noise region and includes a scene identical to or corresponding to a scene included in the first image, and the second converter is trained by using machine learning in which the second image is conversion data and the third image is reference data.

9. A non-transitory computer-readable recording medium which stores an information processing program for causing a computer to perform information processing, the computer including a processor and a memory which stores a first converter and a second converter, the information processing including the following performed by the computer:

obtaining a first image including a noise region;

obtaining noise region estimation information indicating the noise region which is estimated, the noise region estimation information being output from the first converter as a result of the first image being input to the first converter;

obtaining a second image on which noise region removal processing has been performed, the second image being output from the second converter as a result of the noise region estimation information and the first image being input to the second converter;

obtaining a third image which does not include the noise region and includes a scene identical to or corresponding to a scene included in the first image; and generating a fourth image by using the noise region estimation information and the third image, the fourth image including the noise region which is estimated, wherein the first converter is trained by using machine learning in which the first image is reference data and the fourth image is conversion data, and the second converter is trained by using machine learning in which the third image is reference data and the second image is conversion data.

10. The information processing method according to claim 6, wherein the first image is an image captured by a camera, and the noise region is a region including noise caused by a substance adhered on one of a lens and a lens cover of the camera.

* * * * *